(12) United States Patent
Paquet

(10) Patent No.: US 9,703,046 B2
(45) Date of Patent: Jul. 11, 2017

(54) ACTIVE OPTICAL COUPLING SYSTEM AND PHOTONIC INTEGRATED CIRCUIT

(71) Applicant: INSTITUT NATIONAL D'OPTIQUE, Quebec (CA)

(72) Inventor: Alex Paquet, Quebec (CA)

(73) Assignee: INSTITUT NATIONAL D'OPTIQUE, Québec, QC ( * ) Notice: Subject to any disclaimer, the term of this patent is extended or adjusted under 35 U.S.C. 154(b) by 0 days.

(21) Appl. No.: 14/993,448

(22) Filed: Jan. 12, 2016

(65) Prior Publication Data

US 2016/0202420 A1    Jul. 14, 2016

Related U.S. Application Data

(60) Provisional application No. 62/102,947, filed on Jan. 13, 2015.

(51) Int. Cl.
| | |
|---|---|
| *G02B 6/32* | (2006.01) |
| *G02B 6/30* | (2006.01) |
| *G02F 1/137* | (2006.01) |
| *G02B 6/36* | (2006.01) |
| *G02F 1/29* | (2006.01) |

(52) U.S. Cl.
CPC ............ *G02B 6/30* (2013.01); *G02F 1/137* (2013.01); *G02B 6/32* (2013.01); *G02B 6/3652* (2013.01); *G02B 6/3656* (2013.01); *G02F 1/29* (2013.01); *G02F 2001/294* (2013.01)

(58) Field of Classification Search
CPC ............ G02B 6/4204; G02B 6/02033; G02F 2001/13775; G02F 1/0045; G02F 1/0128
USPC .......................................... 385/33, 88, 147, 2
See application file for complete search history.

(56) References Cited

U.S. PATENT DOCUMENTS

| | | | | |
|---|---|---|---|---|
| 5,097,352 A | * | 3/1992 | Takahashi | G02B 13/00 349/200 |
| 5,388,169 A | * | 2/1995 | Kobayashi | G02F 1/1326 349/196 |
| 5,544,268 A | * | 8/1996 | Bischel | G02F 1/011 385/16 |

(Continued)

FOREIGN PATENT DOCUMENTS

JP    2003172913 A  *  6/2003

*Primary Examiner* — Ellen Kim
(74) *Attorney, Agent, or Firm* — Norton Rose Fulbright Canada LLP; Alexandre Daoust

(57) ABSTRACT

The active optical coupling system generally has: a photonic die having a photonic integrated circuit (PIC) waveguide element disposed thereon, the PIC waveguide element having an intermediate coupling element disposed on the PIC waveguide element; a liquid crystal refractive element (LCRE) being optically coupled to the PIC waveguide element of the photonic die via the intermediate coupling element, the LCRE having a first face for receiving light, a second face opposite the first face for outputting the received light, a liquid crystal layer between the first and second faces, and an electrode system arranged to act on the liquid crystal layer; and a controller being electrically connected to the electrode system of the LCRE and being operable to actively control the propagation of the outputted light upon action of the electrode system, said active control allowing coupling of the outputted light into the PIC waveguide element.

19 Claims, 15 Drawing Sheets

(56) References Cited

U.S. PATENT DOCUMENTS

| | | | | |
|---|---|---|---|---|
| 5,596,671 A * | 1/1997 | Rockwell, III | ........ | G02B 6/001 |
| | | | | 385/147 |
| 6,288,767 B1 * | 9/2001 | Murata | ................ | G02B 23/243 |
| | | | | 348/65 |
| 8,860,897 B1 * | 10/2014 | Anderson | ............. | G02F 1/1326 |
| | | | | 349/17 |
| 9,235,097 B2 * | 1/2016 | Meade | ...................... | G02B 6/30 |
| 2002/0159021 A1 * | 10/2002 | Toda | ................... | G02B 6/3588 |
| | | | | 349/196 |
| 2005/0265403 A1 * | 12/2005 | Anderson | ............... | H01S 5/143 |
| | | | | 372/20 |
| 2012/0257131 A1 | 10/2012 | Galstian et al. | | |
| 2013/0202246 A1 | 8/2013 | Meade et al. | | |
| 2015/0125157 A1 * | 5/2015 | Chao | ................... | H04B 10/118 |
| | | | | 398/122 |

\* cited by examiner

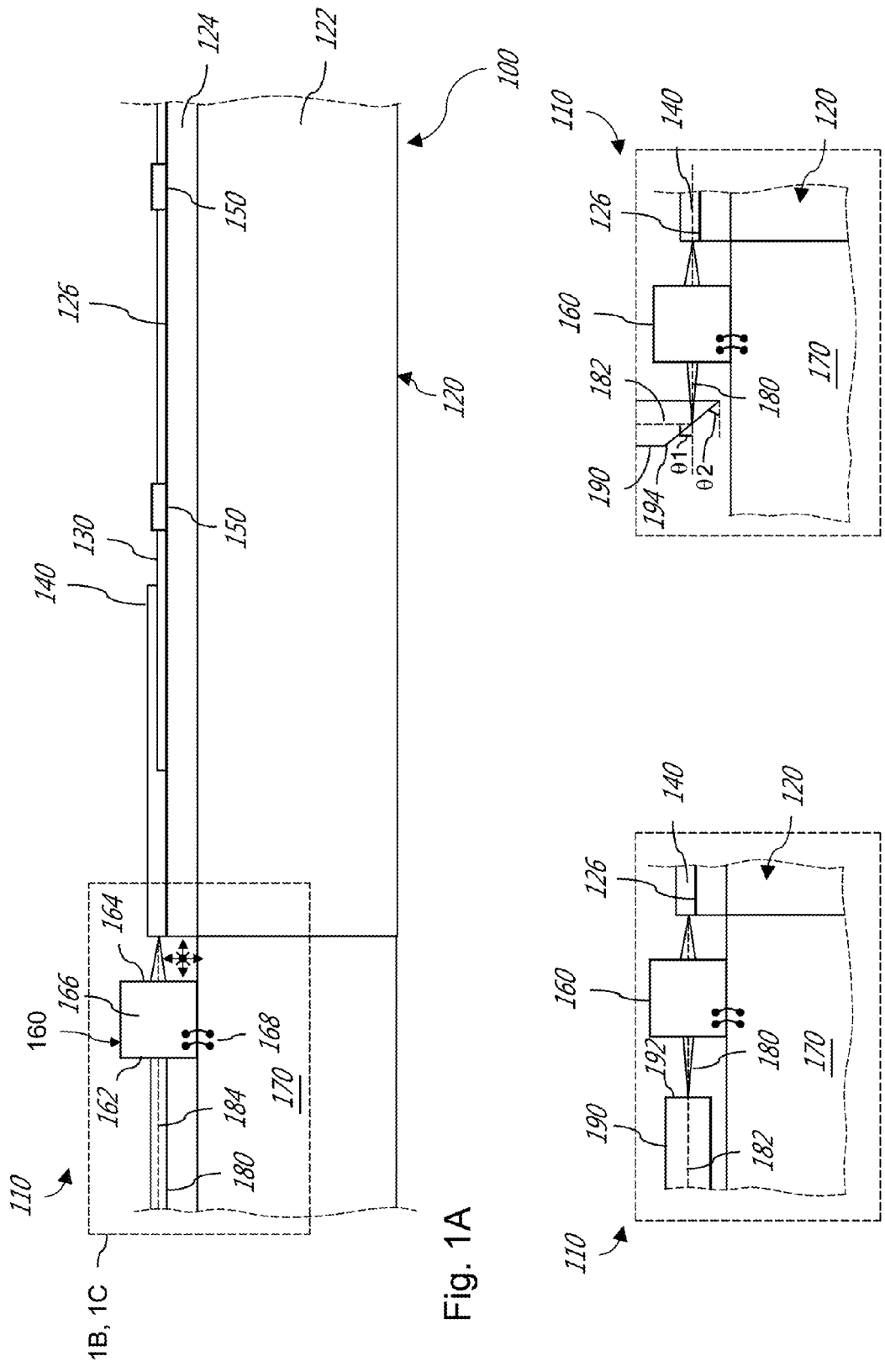

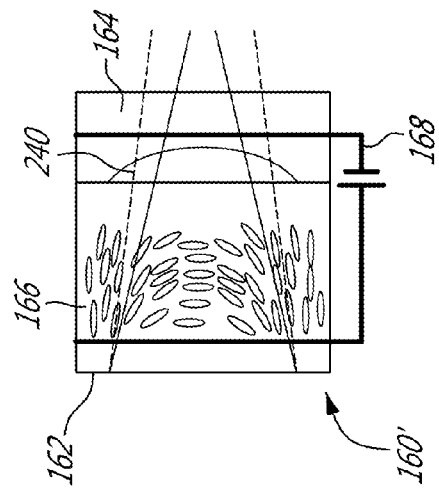
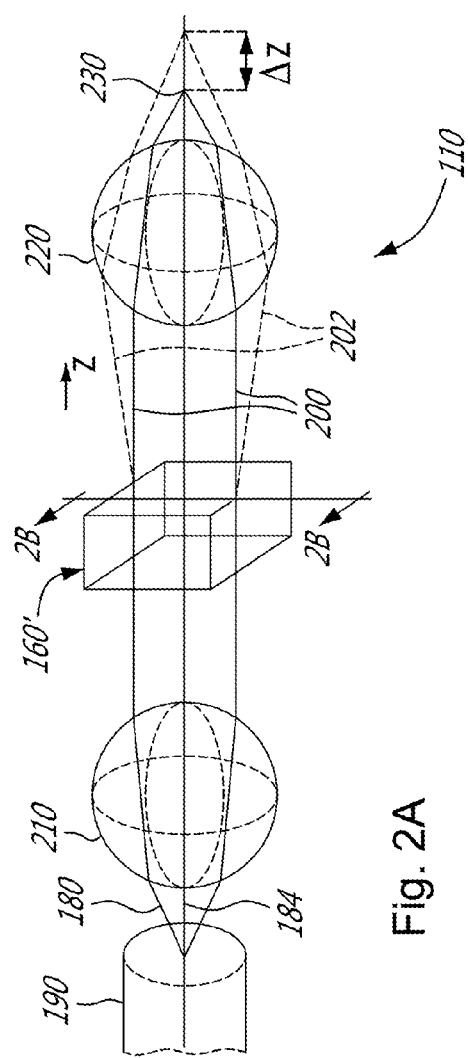
Fig. 2A
Fig. 2B
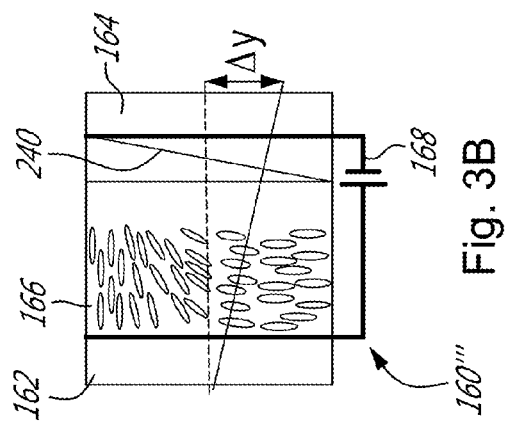
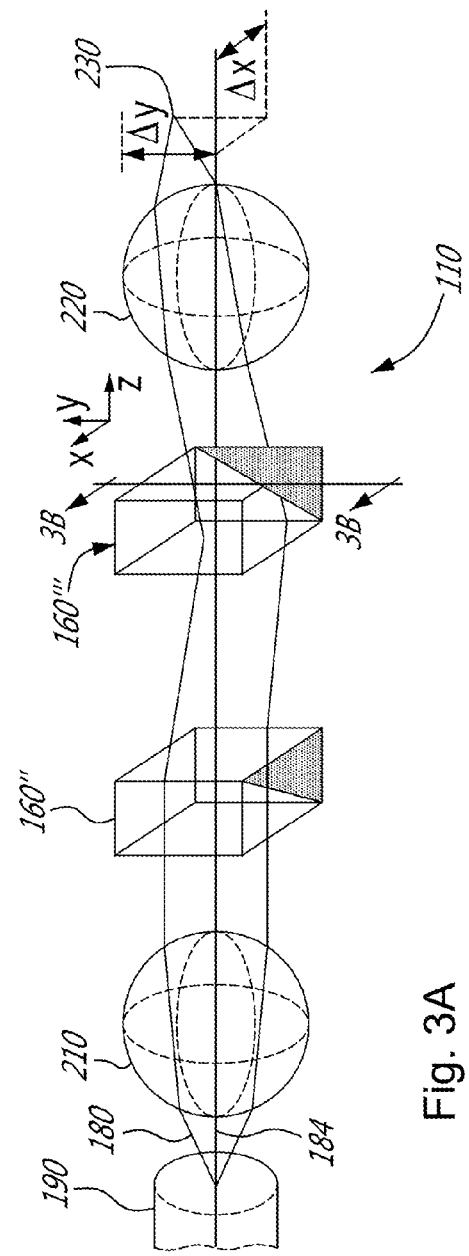
Fig. 3A
Fig. 3B

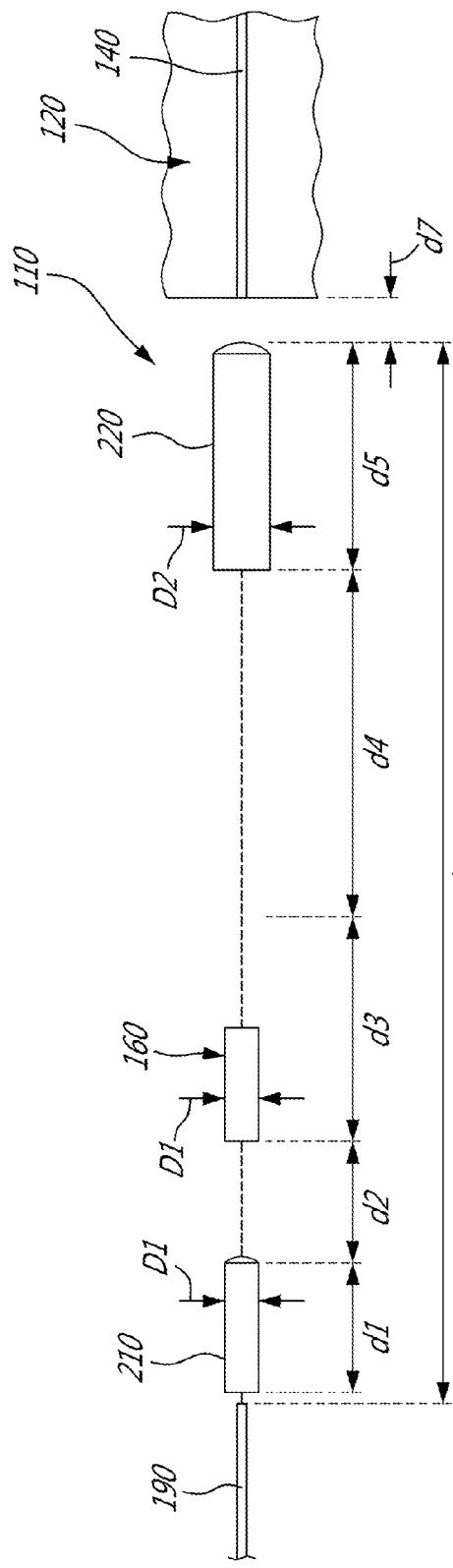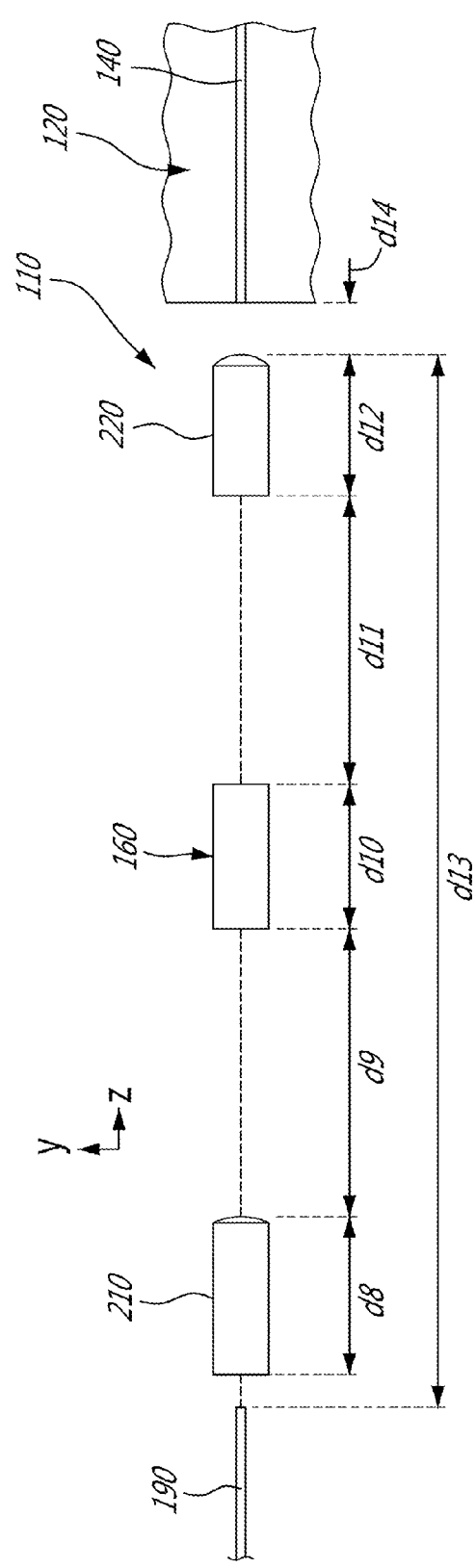

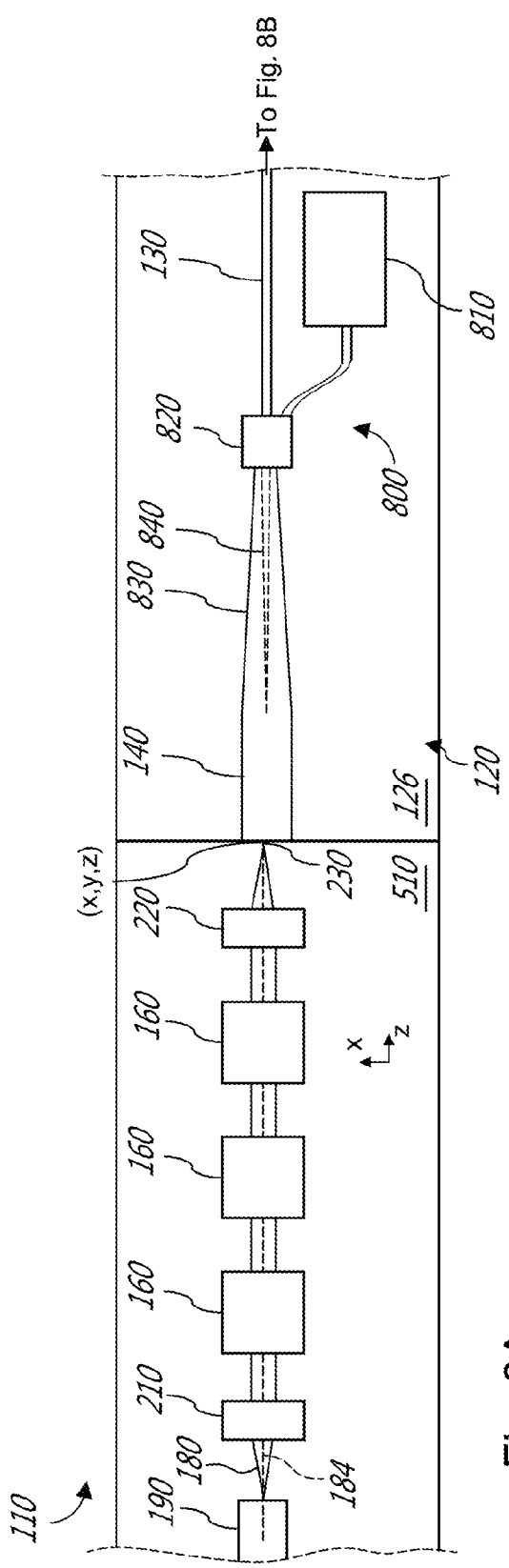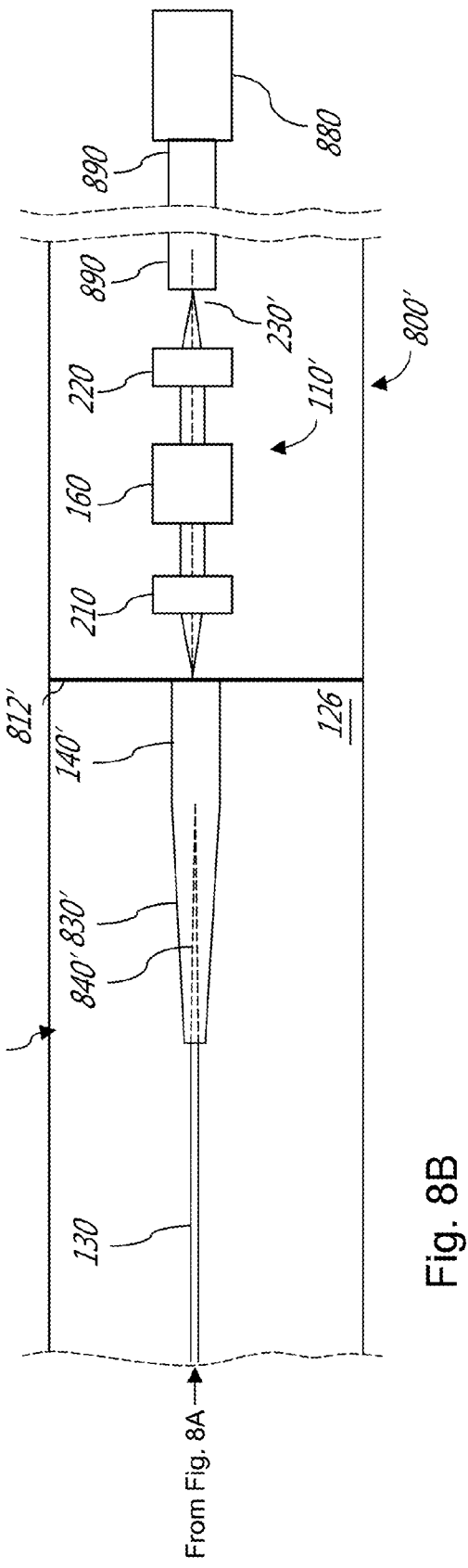
Fig. 8A
Fig. 8B

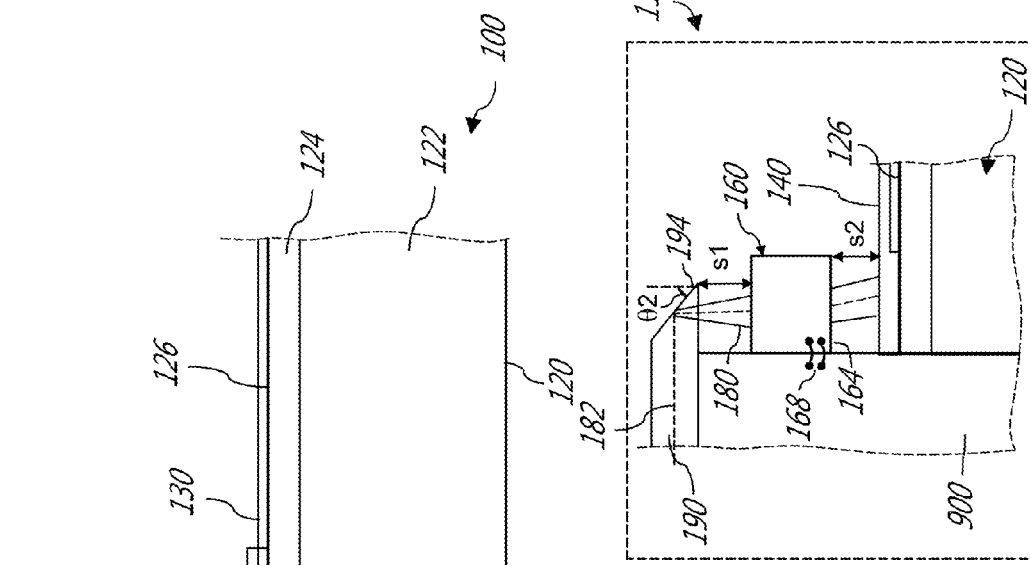
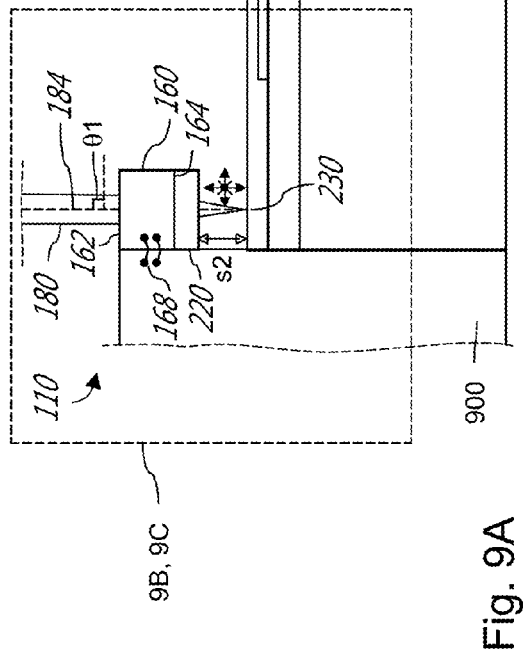
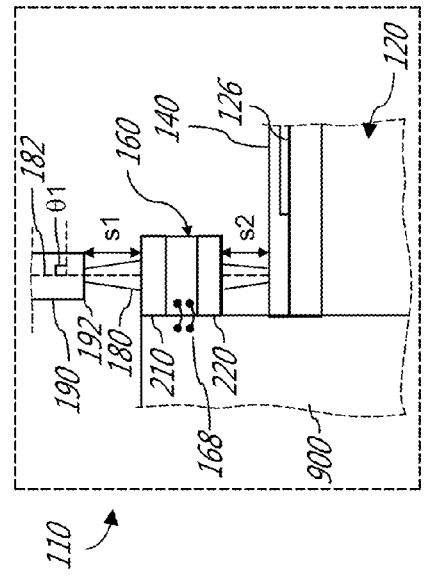

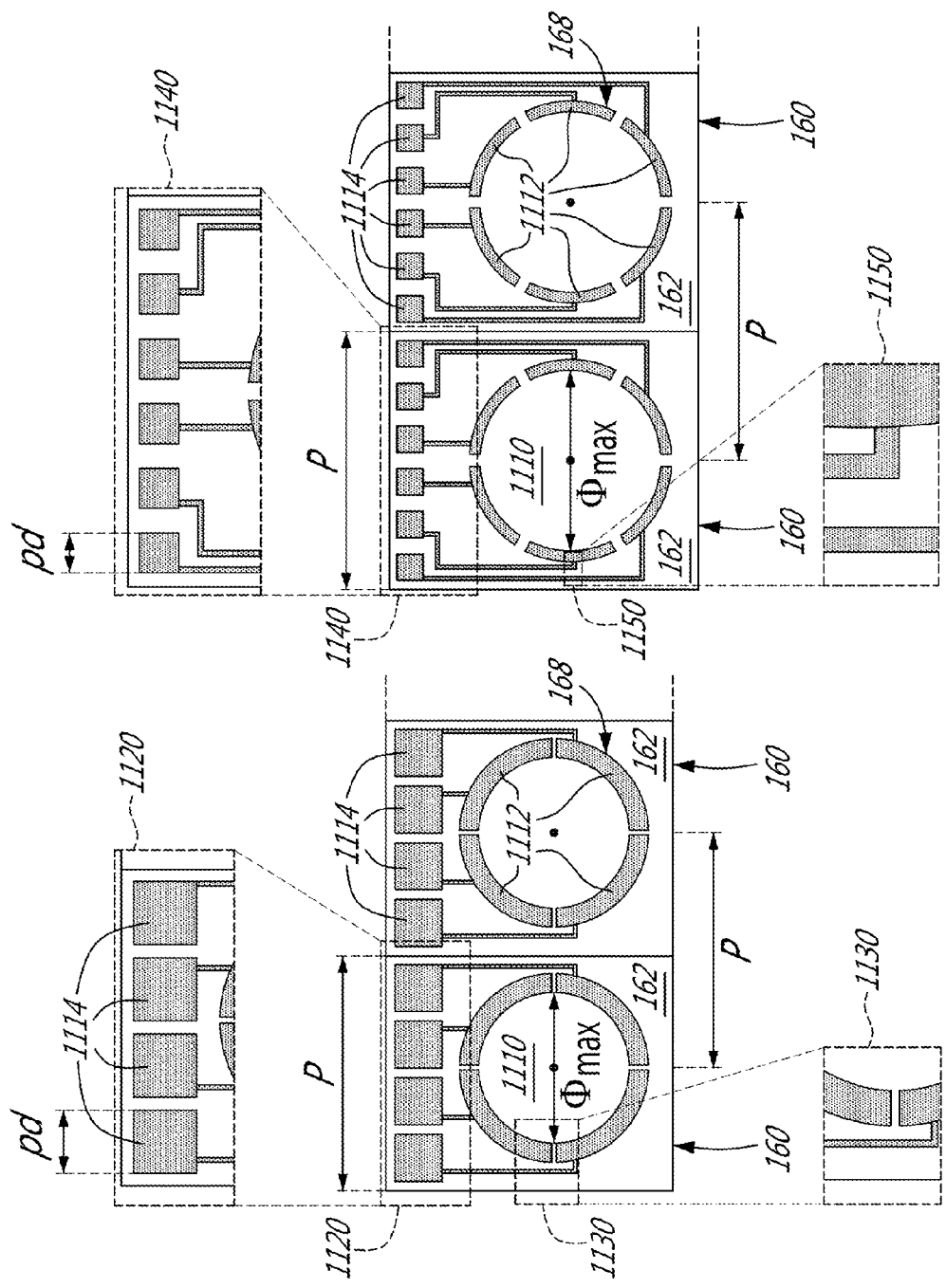

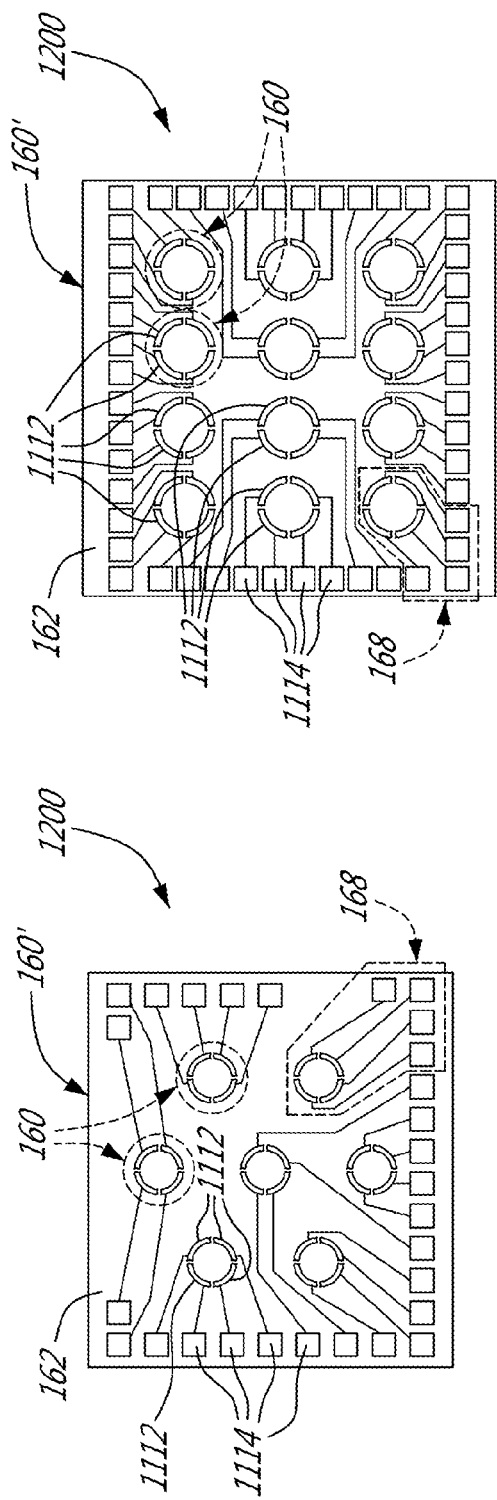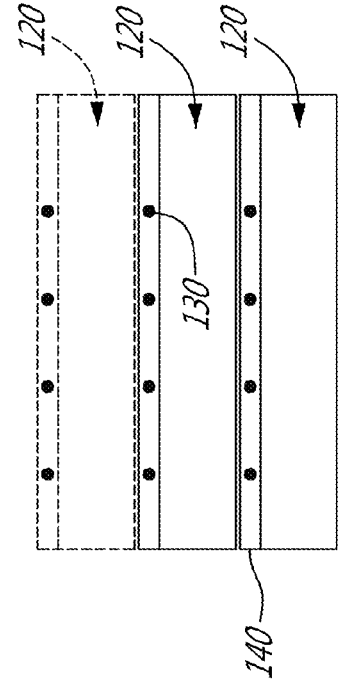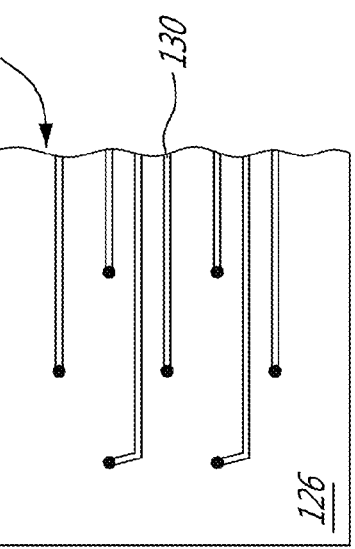

ACTIVE OPTICAL COUPLING SYSTEM AND PHOTONIC INTEGRATED CIRCUIT

REFERENCE TO RELATED APPLICATIONS

This patent application claims priority of U.S. provisional Application Ser. No. 62/102,947, filed on Jan. 13, 2015, the content of which is hereby incorporated by reference.

FIELD

The improvements generally relate to the field of coupling light into a waveguide, and more particularly to the field of coupling light into a waveguide fabricated on a substrate.

BACKGROUND

The development of smaller circuits having improved specifications have been investigated to a certain extent. In some applications, it was found useful to use photonic integrated circuits (PICs), i.e. devices that involve the use of light directly on a photonic chip in a manner analogous to the use of electricity in electronic chips.

These PICs are generally configured to process light and to propagate it from photonic device to photonic device via PIC waveguide elements present on the photonic chip. In some PICs, the light emitted from the exit end of an external waveguide element is coupled to one of the PIC waveguide elements of the PICs. This optical coupling typically involves precise alignment of the external waveguide element relative to the PIC waveguide element in order to achieve an acceptable coupling efficiency, which can be defined as the fraction of the light exiting from the external waveguide element that is coupled and then guided in the PIC waveguide element. Since the external waveguide element, the PIC waveguide elements and the other components required in the optical coupling schemes are manufactured and positioned with finite tolerances, the precise alignment needed for obtaining the acceptable coupling efficiency can be difficult to achieve.

Although the existing optical coupling techniques are found to be satisfactory to a certain extent, there remains room for improvement, especially in terms of improving the coupling efficiency, of relaxing the requirements on the alignment of the external waveguide element relative to one of the PIC waveguide element of the PIC and of compensating for misalignments due to the finite manufacturing tolerances of the components and post-assembly relative displacements of those components.

SUMMARY

In accordance with one aspect, there is provided an active optical coupling system for a PIC, the active optical coupling system comprising: a photonic die having a body with a photonic die surface and a PIC waveguide element disposed on the photonic die surface, the PIC waveguide element having an intermediate coupling element disposed on the PIC waveguide element; at least one liquid crystal refractive element (LCRE) being optically coupled to the PIC waveguide element of the photonic die via the intermediate coupling element, each of the at least one LCRE having a first face for receiving light, a second face opposite the first face for outputting the received light, a liquid crystal layer between the first face and the second face, and an electrode system arranged to generate an electric field acting on the liquid crystal layer; and a controller being electrically connected to the electrode system of the at least one LCRE and being operable to actively control the propagation of the outputted light upon action of the electric field on the liquid crystal layer via the electrode system, said active control allowing coupling of the outputted light into the PIC waveguide element.

In accordance with another aspect, there is provided a PIC comprising: a photonic die having a body with a photonic die surface and a PIC waveguide element disposed on the photonic die surface, the PIC waveguide element having an intermediate coupling element disposed on the PIC waveguide element; at least one LCRE being optically coupled to the PIC waveguide elements of the photonic die via the intermediate coupling element, each of the at least one LCRE having a first face for receiving light, a second face opposite the first face for outputting the received light, a liquid crystal layer between the first face and the second face, and an electrode system arranged to generate an electric field acting on the liquid crystal layer; and a controller being electrically connected to the electrode system of the at least one LCRE and being operable to actively control the propagation of the outputted light upon action of the electric field on the liquid crystal layer via the electrode system, said active control allowing coupling of the outputted light into the PIC waveguide element; and at least one photonic device disposed on the photonic die and coupled to the PIC waveguide element, the at least one photonic device being configured to process the light from the PIC waveguide element for performing at least one processing step on the light coupled in the PIC waveguide element.

In accordance with another aspect, there is provided a use of at least one liquid crystal refractive element for coupling light into a PIC waveguide element of a photonic die.

Many further features and combinations thereof concerning the present improvements will appear to those skilled in the art following a reading of the instant disclosure.

DESCRIPTION OF THE FIGURES

In the figures,

FIG. 1A is a schematic side view of an example of a PIC including an example of an active coupling system adapted for edge coupling, in accordance with an embodiment;

FIG. 1B is an inset of the PIC of FIG. 1A showing the active coupling system receiving light from a perpendicularly-cleaved tip of an external waveguide element, in accordance with an embodiment;

FIG. 1C is an inset of the PIC of FIG. 1A showing the active coupling system receiving light from an angled-cleaved tip of an external waveguide element, in accordance with an embodiment;

FIG. 2A is a schematic oblique view of an example of an active coupling system including a LCRE, in accordance with an embodiment;

FIG. 2B is a schematic side view of an example of the LCRE of FIG. 2A, in accordance with an embodiment;

FIG. 3A is a schematic oblique view of an example of an active coupling system including two LCREs, in accordance with an embodiment;

FIG. 3B is a schematic side view of an example of one of the two LCREs of FIG. 3A, in accordance with an embodiment;

FIG. 6A, FIG. 6B and FIG. 6C are schematic top views of three exemplary configurations of the active coupling system of FIG. 2A;

FIG. 8A is a schematic, partial and top view of an example of a PIC including an active coupling system having a first alignment feedback system, in accordance with an embodiment;

FIG. 8B is a schematic, partial and top view of an example of a second alignment feedback system of the active coupling system of FIG. 8A, in accordance with an embodiment;

FIG. 9A is a schematic side view of an example of a PIC including an example of an active coupling system adapted for vertical coupling, in accordance with an embodiment;

FIG. 9B is an inset of the PIC of FIG. 9A showing an example of an active coupling system receiving light from a perpendicularly-cleaved tip of an external waveguide element, in accordance with an embodiment;

FIG. 9C is an inset of the PIC of FIG. 9A showing an example of an active coupling system receiving light from an angled-cleaved tip of an external waveguide element, in accordance with an embodiment;

FIG. 11A is a schematic front view of examples of two LCREs each having an example of an electrode system with four circumferential electrode segments, in accordance with an embodiment;

FIG. 11B is a schematic front view of examples of two LCREs having an example of an electrode system with six circumferential electrode segments, in accordance with an embodiment;

FIG. 11C is a schematic rear view of an example of a LCRE having an example of an electrode system, in accordance with an embodiment;

FIG. 12A is a schematic top view of an example of a multi-LCRE array having an hexagonal lattice configuration, in accordance with an embodiment;

FIG. 12B is a schematic top view of an example of a photonic die configured for use with the multi-LCRE array of FIG. 12A, in accordance with an embodiment;

FIG. 12C is a schematic side view of an example of a multi-LCRE array having a rectangular lattice configuration, in accordance with an embodiment; and FIG. 12D is a schematic side view of superposed photonic dies configured for use with the multi-LCRE array of FIG. 12C, in accordance with an embodiment.

Figure 4:
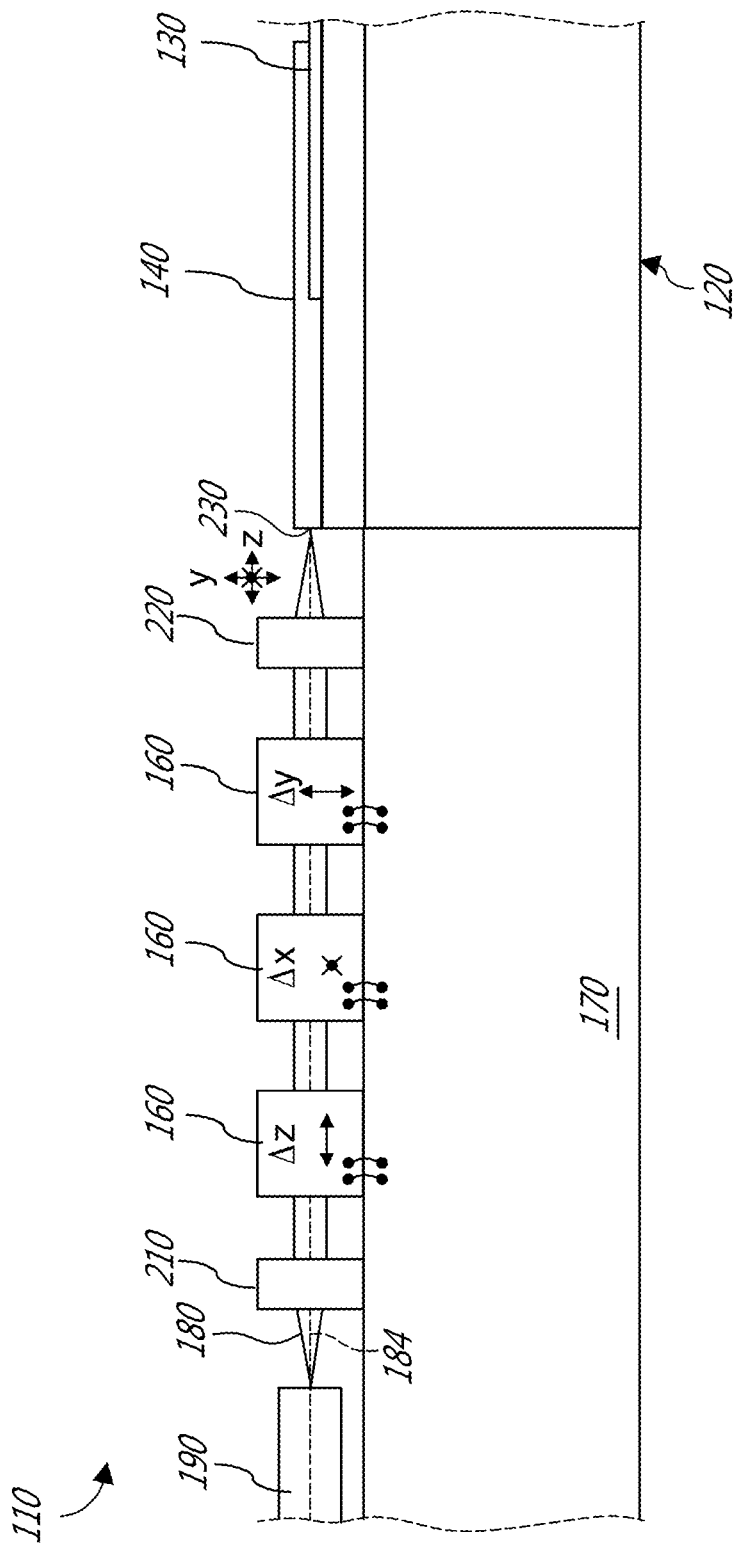
FIG. 4 is a schematic side view of an example of an active coupling system having three LCREs, in accordance with an embodiment.

These drawings depict example embodiments for illustrative purposes, and variations, alternative configurations, alternative components and modifications may be made to these example embodiments.

DETAILED DESCRIPTION

FIG. 1A shows an example of a photonic integrated circuit (PIC) 100 incorporating an example of an active coupling system 110. The active coupling system 110 is adapted to receive a light beam and to couple the received light beam into a photonic chip, which is referred to herein as photonic die 120, using at least one liquid crystal refractive element (LCRE) 160 actively controlled by a controller 170.

Photonic dies 120 are used in recent technological initiatives such as silicon photonics. Each photonic die 120 typically has a body made of a substrate layer 122 and an insulator layer 124 disposed on the substrate layer 122. The insulator layer 124 defines a photonic die surface 126 on which is disposed a PIC waveguide element 130 and an intermediate coupling element 140 optically coupled to the PIC waveguide element 130. The intermediate coupling element 140 is used to enhance coupling of the received light into the PIC waveguide element 130 while the latter delivers the received light to one or more photonic devices 150 of the PIC 100. The photonic devices 150 can be adapted to perform various optical functions including amplifying, multiplexing, demultiplexing, switching, propagating, amplitude/phase modulating, splitting, filtering, optical pumping and detecting, according to the intended use of the PIC 100.

The LCRE 160 of the active coupling system 110 is optically coupleable to the PIC waveguide element 130 of the photonic die 120 via the intermediate coupling element 140. Specifically, the LCRE 160 has a first face 162 for receiving an incoming light beam 180, a second face 164 opposite the first face 162 for outputting the received light beam, a liquid crystal layer 166 disposed between the first face 162 and the second face 164, and an electrode system 168 arranged to generate an electric field acting on the liquid crystal layer 166.

As illustrated in FIG. 1A, the controller 170 of the active coupling system 110 is electrically connected to the electrode system 168 of the LCRE 160. The controller 170 is operable to actively control, via the electrode system 168, the propagation of the outputted light upon action of the electric field on the liquid crystal layer 166. Operation of the active coupling system 110 can redirect the outputted light into the intermediate coupling element 140. More specifically, the controller 170 is adapted to operate the LCRE 160 so that the latter can act as a lens and/or as a prism that refracts the outputted light suitably into the PIC waveguide element 130 of the photonic die 120. In other words, the LCRE 160 is adapted to modify the wavefront of the light propagating therethrough, thus providing convergence, divergence and/or steering of the outputted light, for instance. The controller 170 can be provided in the form of an application-specific integrated circuit (ASIC), a digital-to-analog converter (DAC), a field-programmable gate array (FPGA) or any other suitable type of integrated circuits and printed circuit boards (PCB). It is understood that the position of the controller relative to the LCRE can vary from one embodiment to another.

The coupling of the light into the PIC waveguide element 130 can be monitored, as will be discussed hereinbelow, to increase the coupling efficiency (i.e. the fraction of the light exiting from the external waveguide element 190 that is coupled and then guided in the PIC waveguide element 130) via fine tuning of the electric field acting on the liquid crystal layer 166 using the controller 170. For instance, the controller 170 can be operated with an algorithm to increase the coupling efficiency during use of the active coupling system 110 based on a measured coupling efficiency.

In an embodiment, the controller can be configured to control (e.g., maintain) the temperature of the LCRE during use. A variation of the temperature of the LCRE can impact the refraction of the light and thus controlling the temperature of the LCRE can help avoid undesirable variations of the refraction of the light. It is noted that LCREs are available for operation with low power supplies, so that the power requirements imparted on the PIC may be acceptable.

It is also noted that the LCRE can be made polarization-independent, depending on its configuration. Indeed, the LCRE can be made up of a stack of liquid crystal refractive elements wherein each of the individual elements is adapted to actively control a specific component of the polarization of the received light.

Use of the active coupling system can increase the coupling efficiency of the received light into the PIC waveguide element, which is a key factor in achieving satisfactory packaged PICs. For instance, the active coupling system can be used to relax requirements on the positioning of the incoming light relative to the photonic die and/or to relax the tolerances of the components involved, which can contribute to reduce packaging costs. Indeed, since each of the components of the PIC has its own manufacturing tolerances, satisfactory coupling efficiencies may not be achieved by simple positioning of the components from one another. Accordingly, while passive alignment techniques can provide coupling by some coarse positioning, the active coupling system can help achieve satisfactory coupling efficiencies by fine tuning the coupling of the light into the PIC waveguide element.

In an embodiment, it is contemplated that the active coupling system can be used to align the received light relative to the photonic die while the PIC is being packaged. In another embodiment, the active coupling system can be used to compensate for misalignments caused, for instance, by inadvertent displacements or temperature variations during normal use of the PIC. In still another embodiment, the active coupling system can be used in real-time or near real-time to realign the light relative to the photonic die periodically or once a drop of the coupling efficiency below a given threshold has been detected. In another embodiment, the active coupling system can be used to compensate for post-assembly displacements as well. It is readily understood that the active coupling system may also be used in other situations.

Referring back to FIG. 1A, the incoming light beam 180 has a propagation axis 184 which is parallel to the photonic die surface 126. However, it is envisaged that the propagation axis of the incoming light beam can form an angle $\theta 1$ relative to the photonic die surface which can vary. For instance, the propagation axis can be perpendicular to the photonic die surface or form an obtuse angle (or acute angle) with the photonic die surface, depending on the embodiment. The angle $\theta 1$ can be 0°, 30°, 45° or 90°, for example.

As may be appreciated by a person skilled in the art, some embodiments of the active coupling system can be adapted for "edge coupling" (i.e. with $\theta 1$ about 0°) while others can be adapted for "vertical coupling", wherein $\theta 1$ is set to about 90°. For ease of reading, examples of active coupling systems adapted for edge coupling are described with reference to FIGS. 1A to 8B and examples of active coupling systems adapted for vertical coupling are described with reference to FIGS. 9A to 10C.

It should be noted that the intermediate coupling element 140 can vary from one PIC to another. For instance, the intermediate coupling element can be provided in the form of an adiabatic coupler (as shown in FIG. 8A) disposed over the PIC waveguide element in embodiments involving edge coupling. Likewise, the intermediate coupling element can be provided in the form of a grating coupler connected to an adiabatic coupler in embodiments involving vertical coupling. As it may be appreciated, the intermediate coupling element can be any suitable type of coupling element such as adiabatic couplers, two-dimensional inverted tapers and/or couplers, three-dimensional inverted tapers and/or couplers, grating couplers, or a combination thereof.

The incoming light beam 180 of FIG. 1A can be emitted from a laser source (not shown in the figure). However, the incoming light beam can also be provided by an external waveguide element. FIGS. 1B-C are insets showing two different, but not limiting, examples of active coupling systems 110 adapted for edge coupling where the incoming light beams 180 exit from external waveguide elements 190 towards the LCRE 160. In these examples, the LCRE 160 is disposed on the controller 170 and adjacent to the intermediate coupling element 140 of the photonic die 120, similarly to the example shown in FIG. 1A.

More specifically, FIG. 1B shows that the incoming light beam 180 exits from a perpendicularly-cleaved tip 192 of the external waveguide element 190. In this embodiment, a longitudinal axis 182 of the external waveguide element 190 is generally parallel relative to the photonic die surface 126 of the photonic die 120 (i.e. the angle $\theta 1$ defined above is about zero).

In another embodiment, shown in FIG. 1C, the external waveguide element 190 has an angled-cleaved tip 194. In this case, the longitudinal axis 182 of the external waveguide element 190 extends relatively perpendicularly to the photonic die surface 126 (i.e. $\theta 1$ is about 90°) so that the angled-cleaved tip 194 radiates the incoming light beam 180 in a nearly parallel manner relative to the photonic die surface 126 when the tip 194 has a cleave angle $\eta 2$ of 45°.

It is noted that other configurations of the external waveguide element and its tip relative to the photonic die surface can be used. For instance, the longitudinal axis of the external waveguide element can form an angle $\theta 1$ between 0° and 90°, and the angled-cleaved tip 194 can be adapted to deliver the incoming light beam in a parallel manner relative to the photonic die surface 126 when the cleave angle $\theta 2$ is suitably adjusted (not shown). It is noted that the external waveguide element can be an optical fiber, and more specifically, a single-mode optical fiber such as the SMF-28® manufactured by Corning®, for instance. Moreover, the external waveguide element can also be provided in the form of another photonic chip or photonic die by which the light is exiting from a corresponding PIC waveguide element (not shown).

FIG. 2A shows an example of an active coupling system 110 having a single LCRE for coupling light exiting from the external waveguide element 190. As illustrated in this embodiment, the active coupling system 110 is adapted to process light from a first beam shown in solid lines 200 to a second beam shown in dashed lines 202. Specifically, the active coupling system 110 has an optical imaging system which includes a first refractive element 210 (e.g., a first collimating lens) adapted to at least partially collimate the light exiting from the external waveguide element 190, the LCRE provided in the form of a liquid crystal lens element (LCLE) 160' and a second refractive element 220 (e.g., a second focussing lens) adapted to at least partially focus the light outputted from the LCLE 160' to a focal point 230 along the propagation axis 184. The LCLE 160' is adapted to modify the wavefront of the light propagating therethrough, thus providing either convergence, divergence or steering of the outputted light. The focal lengths of the first and second refractive elements 210 and 220 can be selected to match a first mode field diameter of the light exiting from the external waveguide element 190 to a second mode field diameter of the light to be coupled into the intermediate coupling element. More specifically, the active coupling system 110 is adapted to move the focal point 230 over a distance Δz along the propagation axis 184 (the z axis) during use.

FIG. 2B is a sectional view of the LCLE 160' taken along section 2B-2B of FIG. 2A and shows first and second faces 162 and 164 of the LCLE 160' and the liquid crystal layer 166 therebetween. As shown in this example, the electric field applied on the liquid crystal layer 166 by the electrode system 168 can reorient the liquid crystals of the liquid crystal layer 166 so that the LCLE 160' act as a lens. In this embodiment, the LCLE 160' has a hidden dielectric structure 240 having a lens shape. An example of the hidden dielectric structure 240 is described in K. Asatryan, V. Presnyakov, A. Tork, A. Zohrabyan, A. Bagramyan, and T. Galstian, "Optical lens with electrically variable focus using an optically hidden dielectric structure," Opt. Express 18, 13981-13992 (2010). Such a liquid crystal "tunable lens" can be useful to suitably align the incoming light beam exiting from the external waveguide element along the propagation axis relative to the PIC waveguide element of the photonic die. As will be readily understood, the first and second refractive elements 210 and 220 may be liquid crystal refractive elements, depending on the embodiment. In this case, however, the active coupling system 110 shown in FIG. 2A has three LCREs instead of only one, i.e. the LCLE 160', the first refractive element 210 and the second refractive element 220.

FIG. 3A shows an example of an active coupling system 110 having two LCREs for coupling light exiting from the external waveguide element 190. As depicted, the active coupling system 110 has an optical imaging system which includes the first refractive element 210, the second refractive element 220 and a combination of LCREs provided in the form of two liquid crystal prism elements (LCPEs) 160" and 160''' therebetween. In this specific embodiment, the two LCPEs 160" and 160''' are adapted to act as prisms so that the incoming light beam 180 can be steered along two orthogonal axes x and y which are both perpendicular to the propagation axis 184 represented by the z axis in this case. The LCPEs 160" and 160''' can be adapted to modify (e.g., tilt) the wavefront of the light propagating therethrough. As shown, the active coupling system 110 can move the focal point 230 over a distance Δx along the x axis and/or over a distance Δy along the y axis during use.

FIG. 3B is a sectional view of the LCPE 160''' taken along section 3B-3B of FIG. 3A and shows first and second faces 162 and 164 of the LCPE 160''' and the liquid crystal layer 166 therebetween. As illustrated, the LCPE 160''' is adapted to steer the light beam 180 along the y axis by a distance Δy. It is therefore seen in this figure that the electric field applied on the liquid crystal layer 166 by the electrode system 168 can reorient the liquid crystals of the liquid crystal layer 166 so that the LCPE 160''' act as a prism. In this case, the optically hidden structure 240 has a prism (or wedge) shape. As a result, the focal point 230 can be moved within the intervals Δx and Δy in a plane transverse to the propagation axis 184 upon action of the electric field on the LCPEs 160" and 160'''. Such liquid crystal "tunable prisms" can be used to suitably align the incoming light beam from the external waveguide element along the x and the y axes relative to the PIC waveguide element of the photonic die.

For ease of reading, the expression "LCRE" is used to refer to LCLE(s), LCPE(s) and/or any suitably combination thereof in the following paragraphs.

FIG. 4 shows an example of an active coupling system 110 having three LCREs for coupling the incoming light beam 180 exiting from the external waveguide element 190 to the PIC waveguide element 130 via the intermediate coupling element 140. As illustrated, the active coupling system 110 has an optical imaging system which includes the first refractive element 210, the LCREs 160 illustrated in both FIGS. 2A and 3A and the second refractive element 220. These components are disposed on the controller 170 and are adjacent to the photonic die 120. In this specific embodiment, the active coupling system 110 is adapted to move the focal point 230 along each of the three orthogonal axes x, y and z. For instance, the focal point 230 can be moved within an interval Δx along the transverse x axis, an interval Δy along the transverse y axis and/or an interval Δz along the z axis (the propagation axis 184) using a respective one of the three LCREs 160 discussed earlier.

It is understood that the active coupling system 110 of FIG. 4 can be operated to perform a two-dimensional scan and/or a three-dimensional scan so as to position the focal point 230 at a desired location relative to the intermediate coupling element 140 of the photonic die 120. In an embodiment, the intervals Δx, Δy and Δz can each be at least ±10 μm, preferably more than ±15 μm, even more preferably ±20 μm and even higher depending of the system design and component characteristics. In another embodiment, the displacements along the x, y and z axes can have a resolution of 500 nm, preferably less than 300 nm, even more preferably less than 100 nm, and even below, depending on the design and on the characteristics of the active coupling system.

Figure 5:
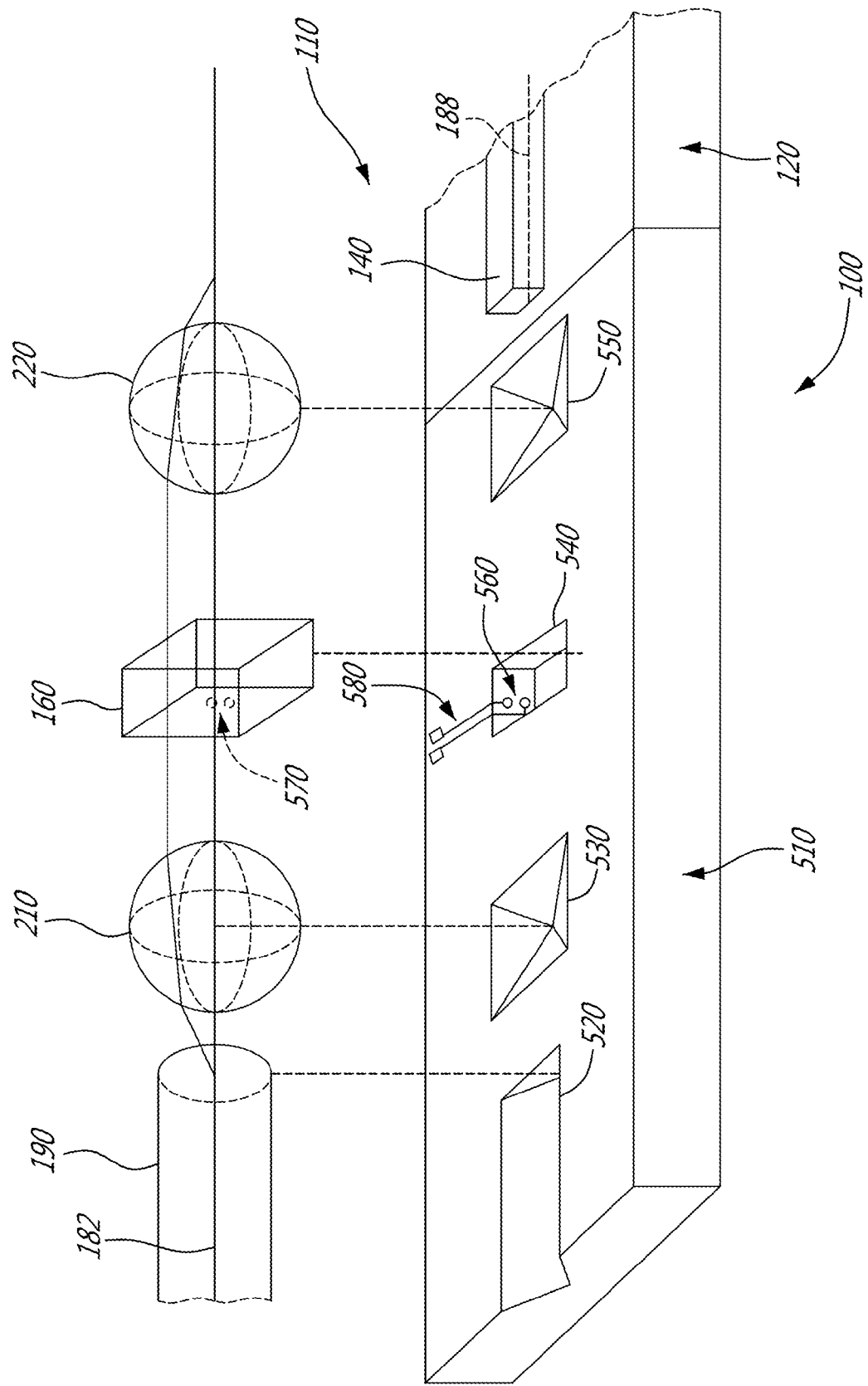
FIG. 5 is a schematic exploded view of an example of a PIC including the active coupling system of FIG. 2A and an example of a passive alignment bench, in accordance with an embodiment.

FIG. 5 shows an exploded view of an example of a PIC 100 including the active coupling system 110 of FIG. 2A. In this embodiment, the external waveguide element 190, the first refractive element 210, the LCRE 160 and the second refractive element 220 are each to be received in a passive alignment bench 510. As shown, the passive alignment bench 510 is disposed adjacent to the photonic die 120. In this specific embodiment, the passive alignment bench 510 has first, second, third and fourth seats (or grooves) 520, 530, 540 and 550 which are each sized and shaped to snugly receive a respective one of the optical elements 190, 210, 160 and 220 to provide passive alignment to these elements. In this embodiment, when the optical elements 190, 210, 160 and 220 are received in their corresponding seats, the longitudinal axis 182 of the external waveguide element 190 is substantially aligned with a longitudinal axis of the intermediate coupling element 140 (shown at 188). Once roughly aligned, the active coupling system can be used to fine tune the alignment of the light into the intermediate coupling element 140 using the LCRE 160.

In this specific embodiment, the third seat 540 has first electrical connectors 560, and the LCRE 160 has corresponding second electrical connectors 570 so that an electrical connection is formed when the LCRE 160 is received in the third seat 540. In this specific embodiment, the first electrical connectors 560 have electrical conductor links 580 (e.g., thin conductive traces which allow for wire bonding and solder bump bonding) which can be connected to the controller 170 (not shown in this embodiment) for controlling the LCRE 160. The optical elements 190, 210, 160 and 220 can be fixed to the passive alignment bench 510 by soldering, gluing or other processes which may be found suitable.

In another possible embodiment, the passive alignment bench can be planar for use with pick-and-place and flip-chip techniques. In these techniques, the passive alignment bench can be marked, e.g., with a given reference pattern, so as to indicate corresponding positions of the optical elements. Once the passive alignment bench is marked, the optical elements can then be precisely positioned at the desired locations. It will be readily understood by one skilled in the art that the term "given reference pattern" is meant to encompass at least the seats, marks, components already disposed on the photonic die and/or a corner thereof, for instance.

The configuration of the first and second electrical connectors relative to the LCRE and the passive alignment bench can differ from an embodiment to another. For instance, in a further embodiment, the first electrical connectors can be positioned in an inner, bottom surface of the third seat, and the second electrical connectors can be positioned on a bottom face of the LCRE for electrical coupling with first electrical connectors. In another embodiment, the LCRE can have the second electrical connectors positioned at a bottom surface thereof and the third seat of the passive alignment bench can have vias (e.g., conductive holes) formed therein so that the LCRE gets electrically connected to the controller through the passive alignment bench when the LCRE is received in the third seat 540. Moreover, the first electrical connectors can be disposed on the passive alignment bench and at a position external but in close proximity to the third seat. The electrical connection between the first and second electrical connectors can be made by permanent contact such as soldering, for instance. In this situation, the first and/or the second electrical connectors can be soldered to one another using solder balls in order to solder the LCRE to the third seat of the passive alignment bench. Also, other types of soldering materials, such as solder paste, and/or bonding materials, such as electrically-conductive epoxy, can be used.

Figure 6C:
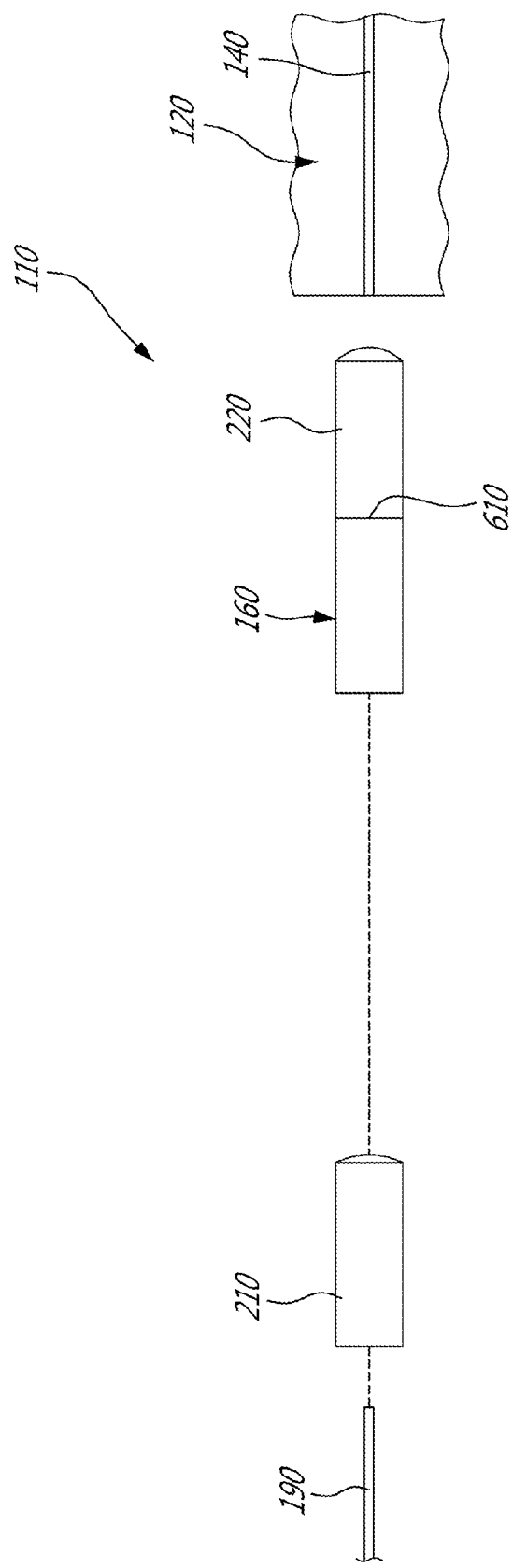

The schematic top views of FIGS. 6A-C show examples of active coupling systems 110 in accordance with three different configurations. In these configurations, the light exits from the external waveguide element 190 towards the active coupling systems 110. Each active coupling system 110 of these configurations includes the first refractive element 210, the LCRE 160 and the second refractive element 220 in order to couple light into the intermediate coupling element 140 of the photonic die 120. Numerical values presented in the following paragraphs are based on the assumption that the external waveguide element 190 has an input mode field diameter of 10.4 µm at a wavelength of 1550 nm for an SMF-28® optical fiber.

Referring specifically to the configuration of FIG. 6A, it was determined that the active coupling system 110 has a magnification of −0.402 with the assumed input mode field diameter. An output mode field diameter of 4 µm can be obtained when the first refractive element 210 has a focal length F1 of 0.46 mm and the second refractive element 220 has a focal length F2 of 0.185 mm along with exemplary distances d1=0.6 mm, d2=0.5 mm, d3=1.0 mm, d4=1.5 mm, d5=1.0 mm, d6=4.644 mm and d7=0.187 mm. In this embodiment, the first refractive element 210 and the LCRE 160 each have a diameter D1 of 0.15 mm, and the second refractive element 220 has a second diameter D2 of 0.2 mm.

Referring to the configuration of FIG. 6B, it was also determined that the active coupling system 110 has a magnification of 0.34 with the assumed input mode field diameter. An output mode field diameter of 3.4 µm can be obtained when the first refractive element 210 has a focal length F1 of 1 mm and the second refractive element 220 has a focal length F2 of 0.34 mm with exemplary distances d8=1.1 mm, d9=2.0 mm, d10=1.0 mm, d11=2.0 mm, d12=1.0 mm, d13=7.322 mm and d14=0.342 mm.

Moreover, FIGS. 6A-B show two active coupling systems 110 having different maximum clear aperture size for the LCRE 160. Indeed, the active coupling system 110 depicted in FIG. 6A has a maximum clear aperture of 150 µm in order to receive light exiting from the external waveguide element 190 and a pitch of 250 µm while the active coupling system 110 of FIG. 6B has a maximum clear aperture of 380 µm and a pitch of 500 µm. Hereinbelow, the pitch is defined as the transverse spacing between a reference point (e.g., the center) of an optical element, such as an external waveguide element or a LCRE, and the corresponding reference point of an adjacent optical element positioned in an array possessing a translational symmetry. Generally, the pitch of the external waveguide element is similar to the pitch of the LCRE so that each of the external waveguide element 190 can be set in registration with a corresponding one of the PIC waveguide elements 130, as will be discussed hereinbelow. It should be noted that using the first and second refractive elements 210 and 220 of FIG. 6B, the displacement along the x axis or the y axis can be in the order of ±15 µm when the LCRE 160 has a refractive index profile gradient of 0.3 refractive index unit (RIU) over the beam diameter of maximum clear aperture, for instance.

FIG. 6C shows a configuration of an active coupling system 110 where the second refractive element 220 is abutted on the LCRE 160. In this configuration, the displacement along the x axis or the y axis can be in the order of ±15 µm when the LCRE 160 has a refractive index profile gradient of 0.15 refractive index unit (RIU) over the beam diameter of maximum clear aperture. In this embodiment, the second refractive element 220 is adhered to the LCRE 160 using a suitable adhesive layer 610. In an alternate embodiment, the second refractive element can be made integral to the LCRE. The second refractive element 220 and the LCRE 160 may be in contact to one another or simply closely abutted.

It is understood that the embodiments described with reference to FIGS. 6A-C are examples adapted for light having a wavelength of 1550 nm guided in an SMF-28 external waveguide element 190. However, an active coupling system can be adapted for any other wavelength or external waveguide element. In case the active coupling system is adapted, the numerical values for the magnification can change.

Figure 7A:
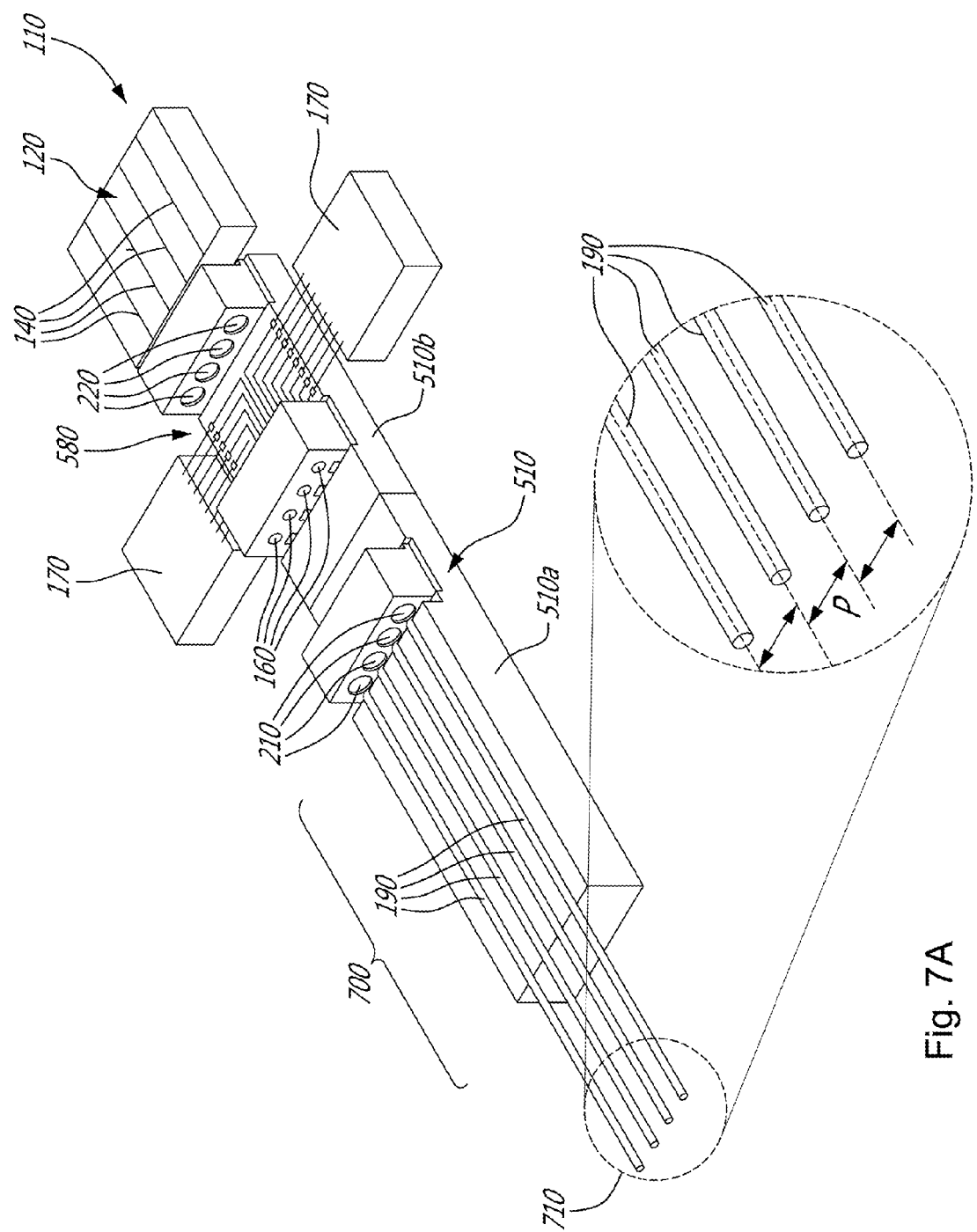
FIG. 7A is a schematic oblique view of an example of an active coupling system for coupling light exiting from an array of external waveguide elements, in accordance with an embodiment.
Figure 7B:
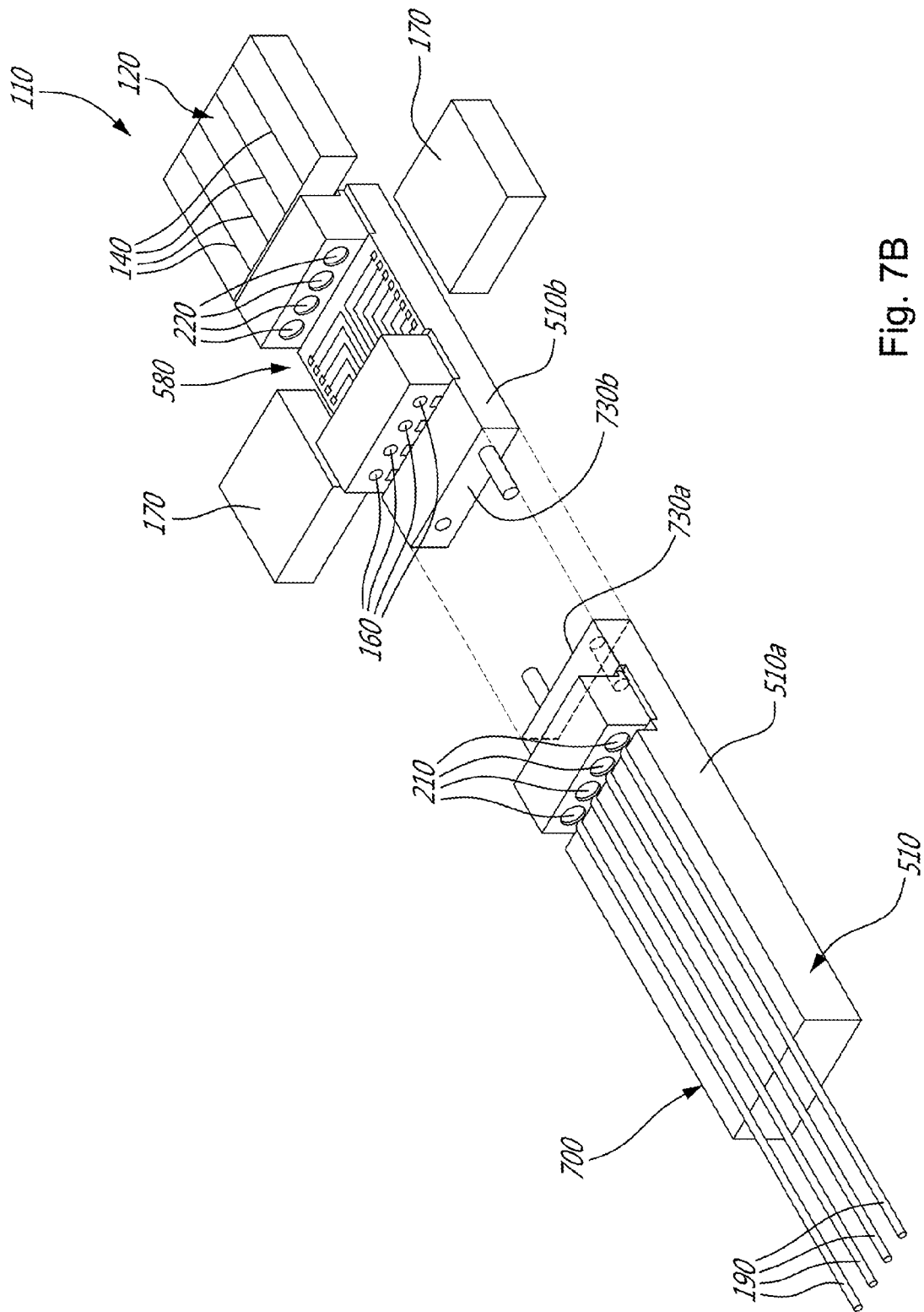
FIG. 7B is a schematic oblique view of the active coupling system of FIG. 7A shown in a disconnected configuration.

FIGS. 7A-B show an example of an active coupling system 110 for coupling light exiting from four different external waveguide elements 190 into four different intermediate coupling elements 140 of the photonic die 120. As depicted, the active coupling system 110 is adapted to receive the light emitted from an array 700 including four external waveguide elements 190. It can be seen from the inset 710 that the array 700 has a pitch p which corresponds, as mentioned earlier, to the distance between two adjacent external waveguide elements 190. In this specific embodiment, the active coupling system 110 has an example of the passive alignment bench 510 adapted to receive four-element linear arrays of each one of the external waveguide elements 190, the first refractive elements 210, the LCREs 160, and the second refractive elements 220. The passive alignment bench 510 also has the electrical conductor links 580 disposed thereon. It can be seen in this embodiment that the controller 170, which is separate from the passive alignment bench 510, is provided as two separate devices connected with corresponding ones of the LCREs 160 via respective ones of the electrical conductor links 580. It is understood that the array 700 is not limited to four external waveguide elements 190. In other embodiments, for instance, the array can have more than one (1), eight (8), twelve (12), sixteen (16), sixty-four (64) or more external optical waveguide elements and associated intermediate coupling waveguides.

As shown, it should be noted that the four LCREs 160 associated with the four external waveguide elements 190 of the array 700 can be provided as a single linear array of 1×4 elements. Moreover, the four first refractive elements 210 can be provided in the form of a single linear array of 1×4, and the four second refractive elements 220 can be provided in the form of a single linear array of 1×4 elements as well. It should further be noted that the electrical conductor links 580 shown in FIGS. 7A-B can be provided in any other suitable configurations.

Such multiwaveguide arrays may require the use of pitch-reducing optical elements (not shown), i.e. optical elements (e.g., PICs) that serve to match an input array of waveguides having a first pitch to an output array of waveguides having a second, smaller pitch. Accordingly, it is understood that the intermediate coupling element can be provided in the form of a pitch-reducing optical element. In another embodiment, the pitch-reducing optical element is provided in the form of a separate PIC and can be optically coupled between the array of external optical waveguides and the photonic die, for instance.

Moreover, FIGS. 7A-B show that the passive alignment bench 510 has first and second bench portions 510a and 510b each having first and second mating surfaces 730a and 730b which are configured to mate to one another. FIG. 7A shows the active coupling system 110 in a connected configuration while FIG. 7B shows the active coupling system 110 in a disconnected configuration. As depicted, the first bench portion 510a is configured to receive the external waveguide elements 190 and the first refractive elements 210 while the second bench portion 510b is configured to receive the LCREs 160, the electrical conductor links 580 and the second refractive elements 220. The first bench portion 510a has the first mating surface 730a to mate with the second mating surface 730b of the second bench portion 510b. The first and second mating surfaces 730a and 730b can be used to provide passive alignment within predetermined tolerances. In another embodiment, the first bench portion can be provided in the form of a first optical connector, and the second bench portion can be provided in the form of a second optical connector. An example of such optical connectors is the multimode version of the MXC™ optical connector available from US Conec.

FIG. 8A shows a partial top view of an example of an active coupling system 110 with a first alignment feedback system 800. Similarly to the embodiment presented in FIG. 4, the active coupling system 110 of FIG. 8A has the first and second refractive elements (e.g., lenses) 210 and 220 as well as the three LCREs 160 for suitably coupling light into the PIC waveguide element 130. The external waveguide element 190, the first refractive element 210, the three LCREs 160 and the second refractive element 220 are received in the passive alignment bench 510 which is disposed adjacent to the photonic die 120. During use, the intermediate coupling element 140, disposed on the photonic die surface 126, is aligned with an axis of the outputted light beam.

The first alignment feedback system 800 of the active coupling system 110 is used to monitor the coupling efficiency. The first alignment feedback system 800 has an optical detector 810 which is optically coupled to the PIC waveguide element 130 via an optical device 820. In this embodiment, the optical device 820 is provided in the form of an optical coupler for coupling a given portion, e.g., 5%, of the light being received into the PIC waveguide element 130 towards the optical detector 810. In another embodiment, the optical device is provided in the form of an optical switch which is adapted to be operated in an open position or a closed position. Accordingly, all of the light received in the PIC waveguide element can be directed toward the optical detector when the optical switch is set open or guided through the PIC waveguide element when the optical switch is set closed.

The first feedback system 800 shown in FIG. 8A can allow real-time or near real-time alignment of the focal point 230 relative to the photonic die 120 in response to the power measured with the optical detector 810. For instance, the controller can be configured to use logic to determine the spatial coordinates (x,y,z) of the focal point 230 which maximize the power measured with the optical detector 810. Exemplary logic-based alignment algorithms can be based on a closed-loop algorithm, an open-loop algorithm, a least-squares algorithm, a signal value decomposition algorithm, one or more lookup tables, one or more transfer functions and/or any combination thereof. Realignment of the active coupling system can be initiated when the power measured with the optical detector 810 has dropped below a predetermined power threshold. During said alignment, an increased power detected by the optical detector can be indicative of a better coupling efficiency.

As depicted in FIG. 8A, the intermediate coupling element 140 is provided in the form of an adiabatic coupler having a tapered end 830, and the PIC waveguide element 130 is also an adiabatic coupler having an inverse-tapered end 840. It should be noted that although the intermediate coupling element 140 shown in FIG. 8A is an adiabatic coupler, the intermediate coupling element 140 can be of any other suitable type, as mentioned above.

In another embodiment, the alignment feedback system can be based on the optical power reflected back to the external waveguide element. In this embodiment, reducing the reflected power corresponds to increasing the coupling efficiency, for instance. In still another embodiment, the alignment feedback system can have an imaging device which images the top of the photonic die so as to monitor scattered light as a function of the position of the focal point relative to the intermediate coupling element during scanning of the focal point. It is noted that other alignment feedback systems may be found convenient for a person skilled in the art. For instance, the spectrum of the reflected light can be analyzed to improve the coupling efficiency.

FIG. 8B shows a top view of a second alignment feedback system 800' for monitoring the light coupled into the PIC waveguide element 130 of FIG. 8A. As depicted, the photonic die 120 has the PIC waveguide element 130 which tapers into the tapered end 840' and a second intermediate coupling element 140' which is inverse-tapered at tapered end 830'. In this embodiment, an output end of the second intermediate coupling element 140' is flush with an edge 812' of the photonic die 120. The light propagating inside the PIC waveguide element 130 can be outputted towards the second alignment feedback system 800'. In this specific example, the second alignment feedback system 800' has a second active coupling system 110' including at least a first refractive element 210, a LCRE 160 and a second refractive element 220. The second active coupling system 110' of the second alignment feedback system 800' is used to actively control the light outputted from its second refractive element 220 into the collection optical fiber 890 (by moving the second focal point 230'). In this embodiment, the collection fiber 890 is optically coupled to an optical detector 880. The optical detector can be a photodiode, and the collection fiber can be a large core fiber, for instance. It is noted that the second alignment feedback system 800' can be either removable from the photonic die 120 or permanently attached to the photonic die 120, depending on the circumstances and use thereof.

During use, the LCREs 160 of both the two active coupling systems 110 and 110' of FIGS. 8A-B are operated iteratively in order to increase the amount of light detected by the optical detector 880. More specifically, for each of a plurality of first positions of the focal point 230 relative to the intermediate coupling element 140 (shown in FIG. 8A), the LCRE 160 of the second active coupling system 110' can be controlled to scan a focal point 230' at a plurality of second positions relative to the collection fiber 890. By doing this, determining the first position and the second position which yield a maximum power as measured with the optical detector 880 can correspond to a satisfactory alignment of the received light relative to the photonic die 120.

FIG. 9A shows an example of a PIC 100 incorporating an example of an active coupling system 110 adapted for vertical coupling. In this figure, like elements already described with reference to FIG. 1A bear similar reference numerals. The active coupling system 110 is configured for coupling the incoming light beam 180 propagating along the propagation axis 184 which is perpendicular to the photonic die surface 126 of the photonic die 120. More specifically, the first face 162 and the second face 164 of the LCRE 160 are parallel to the photonic die surface 126 so as to receive the incoming light beam 180 which has, in this embodiment, its propagation axis 184 at least partially perpendicular (e.g., θ1 is from 80° to 90°) to the photonic die surface 126. In this embodiment, the incoming light beam 180 impinges on the LCRE 160 in a collimated form so the first refractive element is not provided. However, the second refractive element 220 is directly abutted on the second face 164 of the LCRE 160 to focus the outputted light to focal point 230.

A pedestal 900 is provided between the LCRE 160 and the controller to support the LCRE 160 and the second refractive element 220 over the intermediate coupling element 140. As mentioned above, the intermediate coupling element 140 can be provided in the form of a grating coupler in this embodiment.

FIGS. 9B-C are insets showing two different, but not limiting, examples of active coupling systems 110 adapted for vertical coupling where the incoming light beam 180 exits from the external waveguide elements 190 towards the LCRE 160. In these examples, the LCREs 160 are disposed on pedestals 900 and over the intermediate coupling elements 140 of the photonic dies 120.

More specifically, FIG. 9B shows that the incoming light beam 180 exits from the perpendicularly-cleaved tip 192 of the external waveguide element 190. In this embodiment, the longitudinal axis 182 of the external waveguide element 190 is generally perpendicular to the photonic die surface 126 (i.e., θ1 is about 90°). As shown, the active coupling system 110 of FIG. 9B has the first and second refractive elements 210 and 220 and the LCRE 160 therebetween.

In another embodiment, shown in FIG. 9C, the external waveguide element 190 has an angled-cleaved tip 194 (and/or angle-polished tip). In this case, the longitudinal axis 182 of the external waveguide element 190 extends parallel to the photonic die surface 126 (the angle θ1 defined above is about zero) so that the angled-cleaved tip 194 radiates the incoming light beam 180 in a nearly perpendicular (e.g., 80°-90°) manner relative to the photonic die surface when the tip 194 has a cleave angle θ2 of 45°. More specifically, the active coupling system 110 shown in FIG. 9C is adapted to provide an optical beam with a tilted plane wavefront when radiated from the second face 164 of the LCRE 160, in addition to providing a converging and/or a diverging wavefront exiting from the LCRE 160.

As mentioned above, the embodiments shown in FIGS. 9A-C are adapted for vertical coupling. Similarly to the case of edge coupling, an imaging system comprising collimating lenses, focusing lenses, liquid crystal lens elements, liquid crystal prism elements, or any combination thereof, can be used. For instance, the active coupling system 110 of FIG. 9A has the second refractive element 220 while the active coupling system of FIG. 9B has both the first and second refractive elements 210 and 220. Such imaging systems can require first and second clearances s1 and s2, as illustrated in FIG. 9C, to separate the tip of the external waveguide element 190 from the first face 162 of the LCRE 160, and/or for separating the second face 164 of the LCRE 160 from the photonic die 120. Specifically, in the embodiment of FIG. 9A, the second clearance s2 separates an output face of the second refractive element 220 from the photonic die 120. In the embodiment of FIG. 9B, the first clearance s1 separates the tip of the external waveguide element 190 from an input face of the first refractive element 210 and the second clearance s2 separates an output face of the second refractive element 220 from the photonic die 120. Further, it is noted that the pedestal 900 is configured to support the LCRE 160 at a position relative to the photonic die surface 126. The pedestal can be fixed to the photonic die in an embodiment as it can also be separate from the photonic die in some other embodiments. Moreover, the pedestal supporting the LCRE 160 can be provided in the form of the controller 170 which may or may not be directly abutted on the photonic die 120.

Figure 10A:
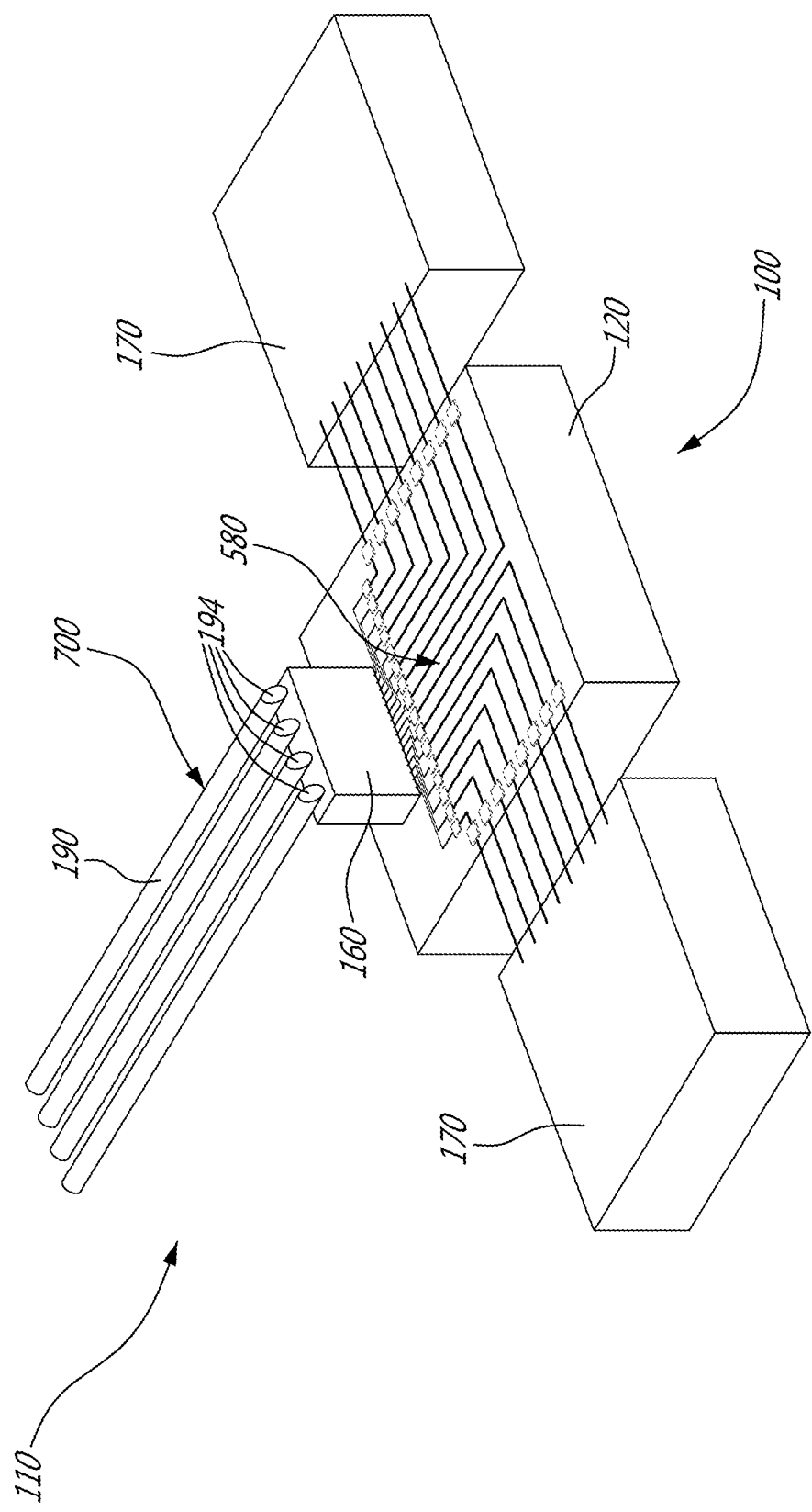
FIG. 10A is a schematic oblique view of an example of a PIC having an active coupling system with exemplary electrical conductor links disposed on a photonic die of the PIC, in accordance with an embodiment.
Figure 10B:
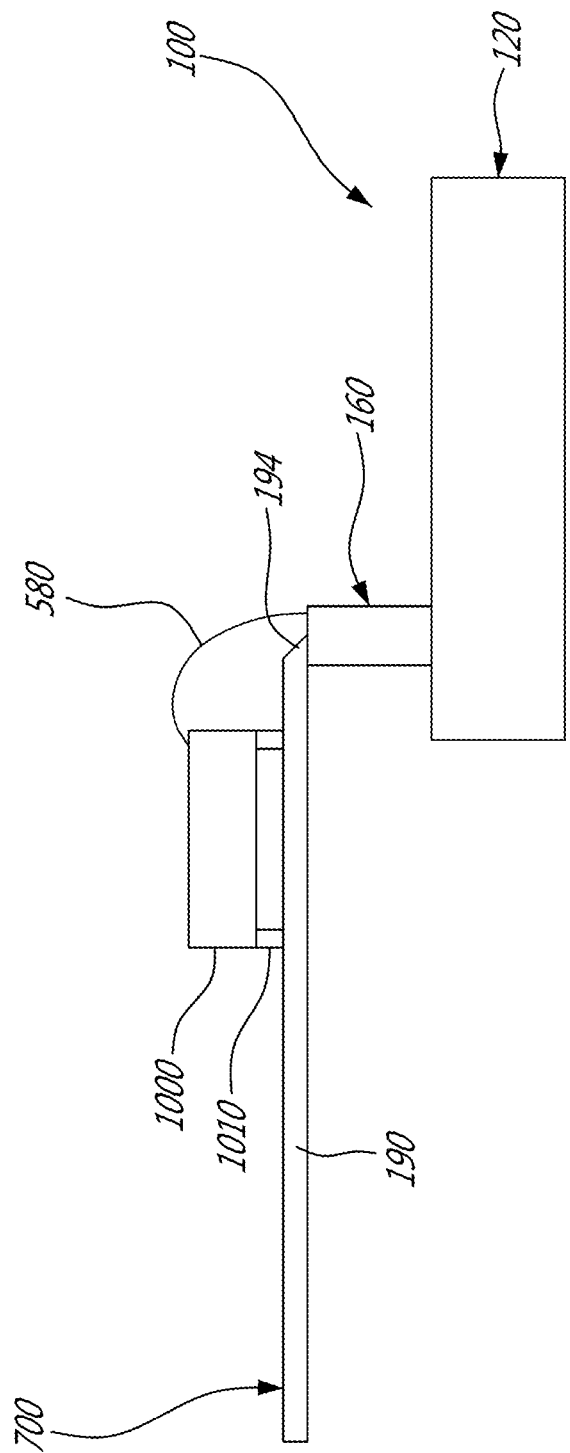
FIG. 10B is a schematic side view of an example of a PIC having an active coupling system with exemplary electrical conductor links disposed on an interposer of an array of external waveguide elements connected to the PIC, in accordance with an embodiment.
Figure 10C:
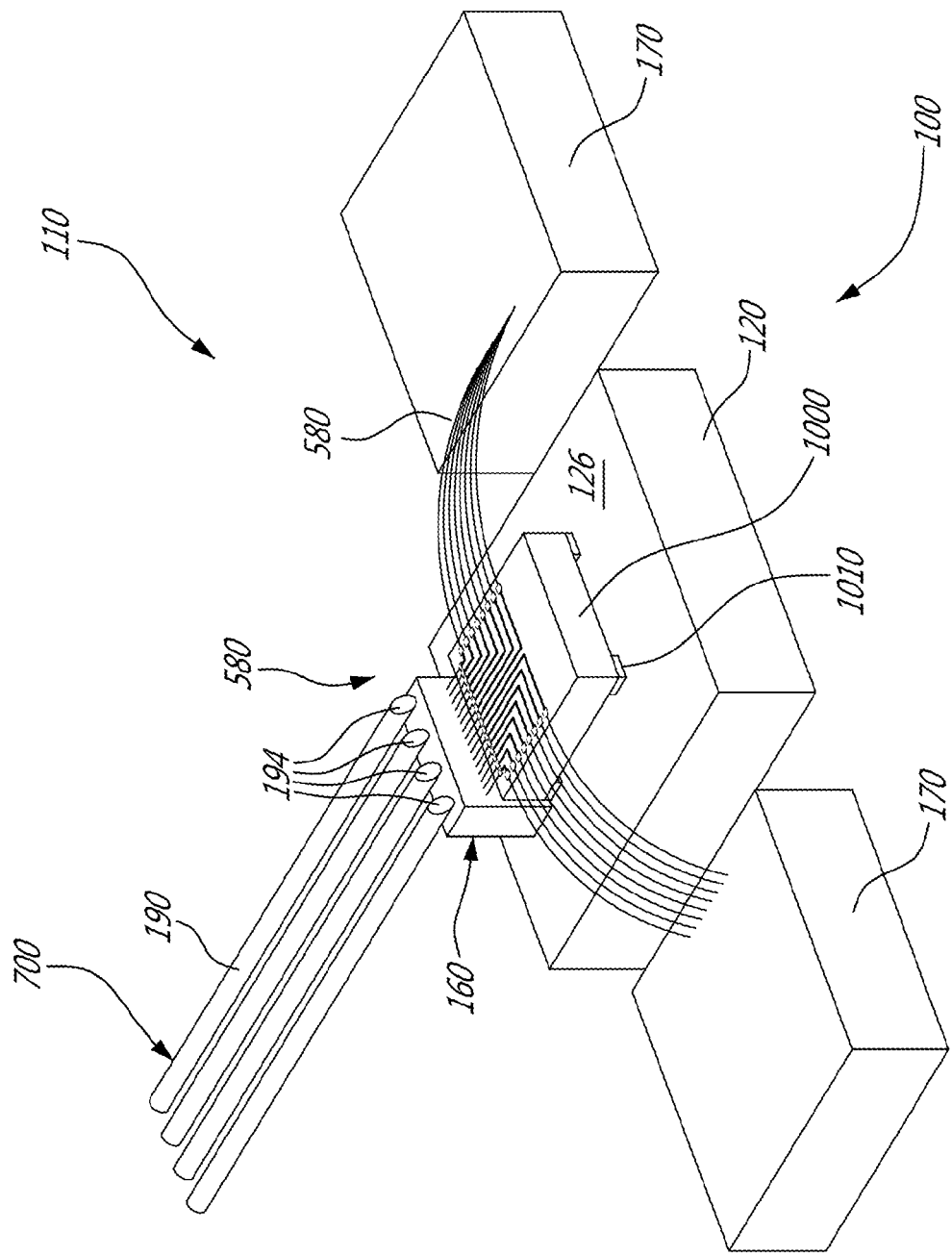
FIG. 10C is a schematic oblique view of an example of a PIC having an active coupling system with exemplary electrical conductor links disposed on an interposer of a photonic die of the PIC, in accordance with an embodiment.

FIGS. 10A-C show examples of PICs 100 having active coupling systems 110 for coupling light from the external waveguide element 190 into the photonic die 120, but having different examples of electrical conductor links 580. In these embodiments, the external waveguide elements 190 are abutted on the LCRE 160, which is, in turn, abutted on the photonic die 120. Such embodiments can be said to be some types of non-imaging couplers or tunable gradient index (GRIN) lenses, as opposed to imaging systems in the embodiments referred to above. These types of non-imaging or GRIN couplers can be useful to get a light beam with a tilted plane wavefront, a converging wavefront or a diverging wavefront when radiated from the LCRE.

As depicted in FIGS. 10A-C, the active coupling system 110 has the array 700 having four external waveguide elements 190 configured for guiding light to the photonic dies 120. The active coupling system can be adapted to more than one external waveguide elements, and is not limited to the embodiment shown in the figures. As illustrated, the external waveguide elements 190 have angle-cleaved tips 194 such as the one shown in FIG. 9C. However, in these embodiments, each angle-cleaved tip 194 is disposed directly on the LCRE 160, which is, in turn, disposed on the photonic die 120.

Referring now to FIG. 10A, it can be seen that the electrical conductor links 580 are patterned directly on the photonic die 120. Each electrical conductor link extends towards a respective one of two components of the controller 170. It is noted that the intermediate coupling elements 140 and the PIC waveguide elements 130 associated with each of the external waveguide elements 190 are not visible in this embodiment, since the latter are positioned below the LCRE 160.

Referring now to FIG. 10B, the electrical conductor links 580 can be patterned on an interposer 1000. The interposer 1000 can be deposited on the photonic die 120 using optional spacers 1010. In the embodiment specifically depicted in FIG. 10B, the interposer 1000 is mounted on the array 700 of external waveguide elements 190 so that when the array 700 is in position relative to the LCRE 160, electrical conductor links 580 are made between the electrode system 168 and the controller (not shown in FIG. 10B). These embodiments may be required in circumstances where the electrical conductor links 580 deposited directly onto the photonic die surface 126 prevent the PIC from properly operating. Indeed, by positioning the electrical conductor links 580 on the interposer 1000, which is at a remote position, any kind of undesired interference (e.g., electromagnetic, thermal, mechanical and the like) between the electrical conductor links 580 and the photonic die 120 can be reduced.

Referring to FIG. 10C, the electrical conductor links 580 are patterned on the interposer 1000 which is indirectly disposed onto the photonic die surface 126 of the photonic die 120 via spacers 1010.

It is noted that the electrode system may extend, for example, both on the first and second faces of the LCRE. The electrode system associated with both the first and second faces of the LCRE, when operated by the controller, collectively acts on the liquid crystal layer in order to modify the wavefront of the light propagating therethrough. As may be appreciated by one skilled in the art, many configurations of the electrode system can be used.

For instance, FIG. 11A shows exemplary first faces 162 of two LCREs 160 each having an example of an electrode system 168. The two LCREs 160 are spaced from one another by a pitch p. More specifically, FIG. 11A shows that the electrode systems 168 are adapted for use with the 250-μm pitch active coupling system 110 shown in FIG. 6A. This specific embodiment has four circumferential electrode segments 1112 patterned around a central portion 1110 of each electrode system 168, a clear aperture ϕmax of 150 μm and a pad distance pd of 49 μm. Each circumferential electrode segment 1112 connects to a pad 1114 located near an edge of a respective one of the LCREs 160. Inset 1120 shows an enlarged view of the pads 1114 of the electrode system 168. Inset 1130 shows an enlarged view of two circumferentially spaced circumferential electrode segments 1112.

FIG. 11B shows other exemplary first faces 162 of two LCREs 160 each having an example of an electrode system 168. More specifically, FIG. 11B shows that the electrode systems 168 of FIG. 11B are adapted for use with the 500-μm pitch active coupling system 110 shown in FIG. 6B. The embodiment of FIG. 11B has six circumferential electrode segments 1112 patterned around a central portion 1110, a clear aperture ϕmax of 380 μm and a pad distance pd of 70 μm. Each circumferential electrode segment 1112 connects to a pad 1114 located near an edge of a respective one of the LCREs 160. Inset 1140 shows an enlarged view of the pads 1114 of the electrode system 168. Inset 1150 shows an enlarged view of one of the circumferential electrode segments 1112 with a portion of an electrical link towards one of the pads 1114.

FIG. 11C shows an example of a LCRE 160 having an example of the portion of an electrode system 168 disposed on a second face 164 thereof. This portion is typically made of a transparent material in order for light to pass through during use. In some other embodiments, the electrode system 168 can be adapted for smaller pitches such as 20 μm, for instance.

As it will be understood, the LCRE of an example of an active coupling system can be provided in the form of a multi-LCRE array designed to receive a plurality of incoming light beams at a plurality of distinct locations on a face of the multi-LCRE array. The configuration of each multi-LCRE array depends on the array of external waveguide elements and can vary depending on the embodiment.

An example of the active coupling system can be adapted for vertical coupling of an hexagonal array of external waveguide elements. This example requires a multi-LCRE array designed accordingly. For instance, FIG. 12A shows an example of such a multi-LCRE array 160'. The multi-LCRE array 160' has a multi-electrode system 1200 to be abutted on a photonic die 120 such as the one shown in the top view of FIG. 12B. As it can be understood, the photonic die 120 shown in FIG. 12B has a plurality of PIC waveguide elements 130 configured to receive the multi-LCRE array 160' in the hexagonal lattice configuration of FIG. 12A.

More specifically, FIG. 12A shows an example of a first face 162 of a multi-LCRE array 160' having seven (7) LCREs 160 arranged in the hexagonal lattice configuration, e.g., one LCRE 160 located at each vertex of an hexagonal figure and one at the center. As depicted, the multi-LCRE array 160' has seven (7) electrode systems 168 that can be collectively referred to as a multi-electrode system 1200 of the multi-LCRE array 160' of FIG. 12A. Each LCRE 160 of the multi-LCRE array 160' is to be concentrically aligned with a respective one of the external waveguide elements of the hexagonal array during use. Each electrode system 168 has four circumferential electrode segments 1112 that connect to pads 1114 located near an edge of the multi-LCRE array 160'. It is noted that the multi-electrode system 1200 is shown to be disposed on the first face 162 of the multi-LCRE array 160', and that it extends also on a second face of the LCRE 160' (not shown in FIG. 12A) for actively controlling the liquid crystal layers therebetween.

Alternatively, an example of an active coupling system can be adapted for edge coupling of a rectangular array of external waveguide elements. For instance, FIG. 12C shows an example of the first face 162 of an example of the multi-LCRE array 160' with twelve (12) LCREs 160 arranged in the rectangular lattice configuration, e.g. a matrix of three rows and four columns of adjacently spaced LCREs 160. In this example, the multi-LCRE array 160' has twelve (12) electrode systems 168 that can be collectively referred to as the multi-electrode system 1200 of the multi-LCRE array 160' of FIG. 12C. The multi-LCRE array 160' of FIG. 12C can be abutted on edges of three superposed photonic dies 120 such as the ones shown in the side view of FIG. 12D, for edge coupling. As it can be understood, the photonic dies 120 of FIG. 12D each have a plurality of PIC waveguide elements 130 configured to receive the multi-LCRE array 160' in the rectangular lattice configuration of FIG. 12C.

FIG. 12D shows three photonic dies 120 stacked one above the other to allow receiving light from the array of external waveguide elements positioned in a rectangular lattice configuration similar to the one shown in FIG. 12C. As shown, the active coupling system can be adapted to receive stacked arrays (not shown) of external waveguide elements so as to form a two-dimensional array or matrix of external waveguide elements. It is noted that other types of two-dimensional configurations can also be used.

It is noted that the configuration of the multi-LCRE array can be imposed by the PIC (e.g., its configuration, the number of PIC waveguide elements, its pitch p) which is to be used for a particular application. In other circumstances, the configuration of the PIC can be chosen depending on the array of external waveguide elements (e.g., its configuration, its number of external waveguide elements, its pitch p).

The composition of the various elements that form the PIC can vary from one embodiment to another. For instance, in an embodiment, the photonic die is a silicon-on-insulator (SOI) wafer. The PIC waveguide element can be provided in the form of a silicon strip waveguide, a ridge, a rib, a slab and the like. In this specific embodiment, the substrate layer of the PIC is made of silicon (Si) and has a thickness of hundred micrometers (e.g., 600-700 μm) while the insulator layer is made of Buried Oxide (also referred to as "BOX") and has a thickness of 2 μm. The photonic die can also include a cladding layer (not shown) which is typically made of silicon dioxide ($SiO_2$) or silicon oxynitride ($SiO_xN_y$). It will be understood by one skilled in the art that the active coupling system 110 can also be used with other types of wafer such as gallium arsenide (GaAs) wafer, for instance.

As it will be appreciated by those skilled in the art, different types of LCREs can be used in the active coupling system 110. Examples of LCREs are described in U.S. Patent Application Publication Number 2012/0257131 to Galstian et al. and entitled "Image stabilization and shifting in a liquid crystal lens" and in H.-C. Lin, M.-S. Chen and Y.-H. Lin, "A Review of Electrically Tunable Focusing Liquid Crystal Lenses", Trans. Electr. Electron. Mater., vol. 12., No. 6, pp. 234-240, (2011). These LCREs allow refractive changes with reorientation of birefringent liquid crystal molecules under the action of the electrical field provided by an electrode system. The electrode system is generally segmented and distributed on a circumference of the liquid crystal layer of the LCRE to perform optical functions such as focusing, steering and tilting, depending on the voltage applied to the electrode system and its geometry. These LCREs are polarization-dependent. However, when the LCRE consists in a stack of liquid crystal refractive elements, as mentioned above, the LCRE can be adapted to be polarization-independent so that the received light can be controlled notwithstanding its polarization state. In this specific embodiment, the liquid crystal elements are generally similar but rotated one from the other.

As can be understood, the embodiments described above and illustrated are intended to be exemplary only. For simplicity the examples presented above described light being provided by the external waveguide element for coupling into the photonic die. However, the active coupling system can also be used to couple the light emitted from the photonic die to the external waveguide element, for instance. Moreover, the active coupling system as described herein can be used concurrently with a spot-size converter adapted to convert the transverse spot size of the light emitted from the external waveguide element into a smaller spot size suited for the intermediate coupling element and the PIC waveguide element. Further, it is understood that the materials used for the optical elements have suitable optical transmission coefficients at the wavelength of the light to be coupled into the photonic die. Likewise, the optical elements may be anti-reflection coated to enhance the overall optical transmission of the active coupling system. It is understood that although the active coupling system involves a photonic die, as discussed in the examples presented hereinabove, the active coupling system can also involve a photonic wafer, an electronic integrated circuit, and any combination thereof. The scope is indicated by the appended claims.

What is claimed is:

1. An active optical coupling system for a photonic integrated circuit (PIC), the active optical coupling system comprising:
    a photonic die having a body with a photonic die surface and a PIC waveguide element disposed on the photonic die surface, the PIC waveguide element having an intermediate coupling element disposed on the PIC waveguide element;
    a first refractive element for at least partially collimating the light exiting from an external waveguide element;
    a liquid crystal refractive element (LCRE) being optically coupled to the PIC waveguide element of the photonic die via the intermediate coupling element, the LCRE having
        a first face for receiving the light collimated by the first refractive element,
        a second face opposite the first face for outputting the received light,
        a liquid crystal layer positioned between the first face and the second face, and
        an electrode system arranged to generate an electric field acting on the liquid crystal layer;
    a second refractive element for at least partially focusing the light outputted from the LCRE, the focused light being directed to the intermediate coupling element of the photonic die for coupling into the PIC waveguide element; and
    a controller being electrically connected to the electrode system of the LCRE and being operable to actively control the propagation of the outputted light upon action of the electric field on the liquid crystal layer via the electrode system, said active control allowing coupling of the focused light into the PIC waveguide element.

2. The active optical coupling system of claim 1, wherein operation of the controller causes the LCRE to act as at least one of a liquid crystal prism element and a liquid crystal lens element to redirect a focal point of the focused light relative to the photonic die.

3. The active optical coupling system of claim 1, wherein the LCRE is adapted to receive the collimated light along a propagation axis at least partially parallel to the photonic die surface.

4. The active optical coupling system of claim 3, wherein the LCRE is positioned adjacent to an edge of the photonic die, the edge of the photonic die being at least partially perpendicular with the PIC waveguide element, the first and second faces of the LCRE being perpendicular to the photonic die surface.

5. The active optical coupling system of claim 1, wherein the LCRE is adapted to receive the collimated light along a propagation axis at least partially perpendicular to the photonic die surface.

6. The active optical coupling system of claim 5, wherein the LCRE is positioned over the photonic die surface at a region of the intermediate coupling element, the first and second faces of the LCRE being at least partially parallel to the photonic die surface.

7. The active optical coupling system of claim 6, wherein the collimated light received at the first face of the LCRE exits from a tip of the external waveguide element, the tip having a cleave angle of about 45° and the external waveguide element having a longitudinal axis at least partially parallel to the photonic die surface.

8. The active optical coupling system of claim 1, further comprising a passive alignment bench having reference patterns for receiving at least a portion of the external waveguide element, the LCRE, the first refractive element and the second refractive element.

9. The active optical coupling system of claim 8, wherein the passive alignment bench has first and second bench portions each including a respective one of first and second mating surfaces.

10. The active optical coupling system of claim 9, wherein the first bench portion is configured to receive at least a portion of the external waveguide element and the first refractive element and the second bench portion is configured to receive the LCRE and the second refractive element.

11. The active optical coupling system of claim 1, further comprising an alignment feedback system for monitoring said coupling of the focused light into the PIC waveguide element.

12. The active optical coupling system of claim 1, where the photonic die is provided in the form of a silicon-on-insulator (SOI) device, and wherein the PIC waveguide element is provided in the form of a silicon strip waveguide.

13. The active optical coupling system of claim 1, wherein the LCRE is provided in the form of a multi-LCRE array and the electrode system is provided in the form of a multi-electrode system.

14. Use of the active optical coupling system of claim 1 for coupling light from the PIC waveguide element to at least one of an external waveguide element and another PIC waveguide element.

15. A photonic integrated circuit (PIC) comprising:
  a photonic die having a body with a photonic die surface and a PIC waveguide element disposed on the photonic die surface, the PIC waveguide element having an intermediate coupling element disposed on the PIC waveguide element;
  a first refractive element for at least partially collimating the light exiting from an external waveguide element;
  a liquid crystal refractive element (LCRE) being optically coupled to the PIC waveguide element of the photonic die via the intermediate coupling element, each of the LCRE having
    a first face for receiving the light collimated by the first refractive element,
    a second face opposite the first face for outputting the received light,
    a liquid crystal layer positioned between the first face and the second face, and
    an electrode system arranged to generate an electric field acting on the liquid crystal layer;
  a second refractive element for at least partially focusing the light outputted from the LCRE, the focused light being directed to the intermediate coupling element of the photonic die for coupling into the PIC waveguide element; and
  a controller being electrically connected to the electrode system of the LCRE and being operable to actively control the propagation of the outputted light upon action of the electric field on the liquid crystal layer via the electrode system, said active control allowing coupling of the focused light into the PIC waveguide element; and
  at least one photonic device disposed on the photonic die and coupled to the PIC waveguide element, the at least one photonic device being configured for performing at least one processing step on the light from the PIC waveguide element.

16. The photonic integrated circuit of claim 15, wherein the LCRE is adapted to receive the collimated light along a propagation axis at least partially perpendicular to the photonic die surface.

17. The photonic integrated circuit of claim 15, wherein the LCRE is adapted to receive the collimated light along a propagation axis at least partially parallel to the photonic die surface.

18. The active optical coupling system of claim 1 wherein the LCRE includes a plurality of LCREs positioned between the first refractive element and the second refractive element and arranged in series with one another, a first one of the plurality of LCREs having a first face receiving the light collimated by the first refractive element and a second face outputting the received light towards a second one of the plurality of LCREs and so forth in a manner that the second face of a last one of the plurality of LCREs outputs the received light towards the second refractive element.

19. An active optical coupling system for a photonic integrated circuit (PIC), the active optical coupling system comprising:
  a photonic die having a body with a photonic die surface and a PIC waveguide element disposed on the photonic die surface, the PIC waveguide element having an intermediate coupling element disposed on the PIC waveguide element;
  a liquid crystal refractive element (LCRE) being optically coupled to the PIC waveguide element of the photonic die via the intermediate coupling element, the LCRE having a first face for receiving light, a second face opposite the first face for outputting the received light, a liquid crystal layer positioned between the first face and the second face, and an electrode system arranged to generate an electric field acting on the liquid crystal layer, the LCRE being arranged relative to the photonic die to receive the light along a propagation axis at least partially perpendicular to the photonic die surface; and
  a controller being electrically connected to the electrode system of the LCRE and being operable to actively control the propagation of the outputted light upon action of the electric field on the liquid crystal layer via the electrode system, said active control allowing coupling of the outputted light into the PIC waveguide element.

* * * * *